US010746533B2

(12) United States Patent
Okuyama et al.

(10) Patent No.: US 10,746,533 B2
(45) Date of Patent: Aug. 18, 2020

(54) RELATIVE POSITION DETECTION MEANS AND DISPLACEMENT DETECTION DEVICE

(71) Applicant: Dmg Mori Co., Ltd., Nara (JP)

(72) Inventors: Shun Okuyama, Kanagawa (JP); Akinori Suzuki, Kanagawa (JP)

(73) Assignee: DMG MORI CO., LTD., Yamatokoriyama-Shi, Nara (JP)

( * ) Notice: Subject to any disclaimer, the term of this patent is extended or adjusted under 35 U.S.C. 154(b) by 0 days.

(21) Appl. No.: 16/053,590

(22) Filed: Aug. 2, 2018

(65) Prior Publication Data

US 2019/0041194 A1 Feb. 7, 2019

(30) Foreign Application Priority Data

Aug. 2, 2017 (JP) .................. 2017-149766
Aug. 8, 2017 (JP) .................. 2017-153710
Sep. 25, 2017 (JP) .................. 2017-184103
Feb. 16, 2018 (JP) .................. 2018-025747

(51) Int. Cl.
*G03F 7/20* (2006.01)
*G01B 11/14* (2006.01)
(Continued)

(52) U.S. Cl.
CPC ............ *G01B 11/14* (2013.01); *G01B 11/26* (2013.01); *G01D 5/285* (2013.01); *G01D 5/30* (2013.01);
(Continued)

(58) Field of Classification Search
CPC ........ G02B 7/09; G02B 27/0101; G02B 3/14; G02B 2027/0138; G02B 2027/014; G02B 26/004; G02B 27/0068; G02B 13/009; G02B 19/0028; G02B 26/0833; G02B 27/0977; G02B 27/425; G02B 5/0215; G02B 5/045; G02B 5/1833; G02B 5/3025;
(Continued)

(56) References Cited

U.S. PATENT DOCUMENTS

2012/0154805 A1* 6/2012 Holzapfel .......... G01D 5/34715
  356/365
2015/0260652 A1* 9/2015 Verstegen ................. G01J 3/44
  356/311
2018/0120714 A1* 5/2018 Zijp ................... G02B 21/0016

FOREIGN PATENT DOCUMENTS

JP 2009-300263 12/2009
JP 2016-142552 8/2016

* cited by examiner

Primary Examiner — Mesfin T Asfaw
(74) Attorney, Agent, or Firm — David R. Stevens; Stevens Law Group

(57) ABSTRACT

Example position detection means and displacement detection devices are described. A relative position detection means optically detects a relative position of displacement of an object to be measured in a measuring direction, including a target mounted on the object to be measured and irradiated with light from a light source; a light receiver for detection of relative position for receiving light by changing polarization state of reflected light at the target with respect to the light; and a relative position information output unit for outputting relative position information based on displacement of the target in the measuring direction based on change of polarization state of the reflected light. The target includes a reflector mounted on the object to be measured and a birefringent member on the reflector and having a thickness changing from a tip to a base end along the measuring direction.

12 Claims, 20 Drawing Sheets

(51) Int. Cl.
*G01D 5/34* (2006.01)
*G01D 5/28* (2006.01)
*G01D 5/30* (2006.01)
*G01B 11/26* (2006.01)
*G02B 5/30* (2006.01)
G02B 6/34 (2006.01)
G02B 27/28 (2006.01)

(52) U.S. Cl.
CPC ............ *G01D 5/344* (2013.01); *G02B 5/3083* (2013.01); *G02B 6/34* (2013.01); *G02B 27/283* (2013.01)

(58) Field of Classification Search
CPC .. G02B 6/0028; G02B 6/122; G02B 13/0015; G02B 19/0061; G02B 19/0066; G02B 2006/12104; G02B 26/06; G02B 26/08; G02B 26/0841; G02B 26/123; G02B 27/0075; G02B 27/0103; G02B 27/0972; G02B 27/144; G02B 27/26; G02B 27/4205; G02B 5/005; G02B 5/008; G02B 5/1842; G02B 5/3083; G02B 6/0016; G02B 6/0025; G02B 6/003; G02B 6/0036; G02B 6/0053; G02B 6/0055; G02B 6/0056; G02B 6/0066; G02B 6/009; G02B 6/124; G02B 6/4206; G02B 7/02; G02B 7/06; G02B 7/1805; G02B 7/182; G01B 11/24; G01B 15/04; G01B 17/06; G01B 21/20; G01B 2210/56
See application file for complete search history.

RELATIVE POSITION DETECTION MEANS AND DISPLACEMENT DETECTION DEVICE

BACKGROUND OF THE INVENTION

Field of the Invention

The present invention relates to a relative position detection means provided in a displacement detection device for detecting a displacement of a movable part of a machine tool, a semiconductor manufacturing device or the like, and also, to a displacement detection device provided with the relative position detection means. In addition, the present application claims priority based on Japanese Patent Application No. 2017-149766 filed in Japan on Aug. 2, 2017, Japanese Patent Application No. 2017-153710 filed in Japan on Aug. 8, 2017, Japanese Patent Application No. 2017-184103 filed in Japan on Sep. 25, 2017, Japanese Patent Application No. 2018-025747 filed in Japan on Feb. 16, 2018, which are incorporated by reference herein.

Description of Related Art

From the past, a displacement detection device using light has been utilized widely as a contactless measuring device of displacement of an object to be measured. The displacement detection device detects displacement amount of the object to be measured by changing phase of light from light source based on displacement of the object to be measured, which is the movable part, and by detecting changing state of phase of the light. Recently, centering on the machine tool and the semiconductor manufacturing device, a displacement detection device with high resolution capable of measuring displacement of 1 nm or less is required.

As the displacement detection device with such high resolution, for example, there are inventions described in patent documents 1 and 2. In patent document 1, it is disclosed about a laser interferometer capable of achieving high precision measurement by preventing measurement error based on deviation between optical axes of two types of light waves with different wavelengths. On the other hand, in patent document 2, it is disclosed about a displacement detection device capable of stably detecting displacement amount with high precision by configuring a polarization maintaining fiber in optional length according to oscillation characteristic of a light source.

Patent Document 1: Japanese Patent Application Laid-Open No. 2009-300263
Patent Document 2: Japanese Patent Application Laid-Open No. 2016-142552

SUMMARY OF THE INVENTION

However, in the displacement detection device described in patent documents 1 and 2, a period of incremental signal showing relative position information of a target to be measured arranged at the object to be measured moving in a measuring direction is determined by shape and performance of parts provided in the displacement detection device. In other words, in the lase interferometer described in patent document 1, signal period is determined by wavelength of used light source, and in displacement detection device described in patent document 2, signal period is determined by a spacing of grating of diffraction grating arranged at a surface to be measured. Therefore, it was difficult to correspond to wide signal period without changing parts provided in the displacement detection device. In order to achieve stable and high precision detection of displacement amount, it is desired to be able to correspond to wide incremental signal period when detecting relative position information of the target.

The present invention is invented considering the above problems, and the purpose of the present invention is to provide new and improved relative position detection means capable of corresponding to wide signal period with simple structure, and also, to provide a displacement detection device provided with the relative position detection means.

One embodiment of the present invention is a relative position detection means for optically detecting a relative position of displacement of an object to be measured in a measuring direction, comprising: a target mounted on the object to be measured and irradiated with light from a light source; a light receiver for detection of relative position for receiving light by changing polarization state of reflected light at the target with respect to the light; and a relative position information output unit for outputting relative position information based on displacement of the target in the measuring direction based on change of polarization state of the reflected light received at the light receiver for detection of relative position, wherein the target comprises: a plate-shaped reflector mounted on the object to be measured; and a birefringent member provided on the reflector and having a thickness changing from a tip to a base end along the measuring direction, the birefringent member is configured such that tip side of a bottom surface is rotatable with respect to the reflector with base end side of the bottom surface as a center.

According to one embodiment of the present invention, a period of incremental signal showing relative position information of the target is determined by arrangement and inclination of the birefringent member, so it is possible to correspond to wide signal period with simple structure.

At this time, in one embodiment of the present invention, the light receiver for detection of relative position may detect a change of polarization state of the reflected light along with movement of the target in the measuring direction, and the relative position information output unit may output the relative position information of the target based on a signal obtained by photoelectric conversion of a change of polarization state of the reflected light.

In this way, it is possible to output the relative position information of the target surely and precisely while being capable of corresponding to wide signal period with simple structure, so stable and high precision detection of displacement will be possible.

In addition, in one embodiment of the present invention, the light receiver for detection of relative position may comprise: a beam splitter for splitting the reflected light into two; a first polarizing beam splitter for transmitting P component and reflecting S component of one reflected light split by the beam splitter; a first light receiving element for receiving transmitted light of the first polarizing beam splitter; a second light receiving element for receiving reflected light of the first polarizing beam splitter; a second polarizing beam splitter for transmitting P component and reflecting S component of another reflected light split by the beam splitter; a quarter wavelength plate interposed between the beam splitter and the second polarizing beam splitter; a third light receiving element for receiving reflected light of the second polarizing beam splitter; and a fourth light receiving element for receiving transmitted light of the second polarizing beam splitter.

In this way, it is possible to surely detect a change of polarization state of the reflected light along with movement of the target in the measuring direction with simple structure.

In addition, in one embodiment of the present invention, the birefringent member may be configured by arranging a plurality of different members in parallel along the measuring direction, or may be configured by laminating a plurality of different members along incident direction of the light.

In this way, it is possible to easily change a period or sensitivity of signal output showing a change of polarization state of the reflected light along with movement of the target in the measuring direction with simple structure.

In addition, in one embodiment of the present invention, the birefringent member may be configured by laminating a plurality of members with different crystal axis direction along incident direction of the light.

In this way, it is possible to inhibit an influence by thermal fluctuation or wavelength variation of a light source when crystal axis direction of each member composing the birefringent member is being orthogonal to each other, or the like.

In addition, in one embodiment of the present invention, a correction prism may be provided at any of front stage side or rear stage side of the birefringent member with respect to the light source.

In this way, stable and high precision detection of displacement by absolute position detection means of rear stage side will be possible, as polarization state in beam distribution transmitted through the birefringent member will be uniform.

In addition, in one embodiment of the present invention, two light receivers for detection of relative position may be arranged along the measuring direction, and it may be arranged to estimate and correct wavelength variation amount based on a difference of phase fluctuation amount of polarization state of the reflected light detected by each light receiver for detection of relative position.

In this way, it is possible to estimate wavelength variation amount easily based on a difference of phase fluctuation amount of polarization state of the reflected light detected by each light receiver for detection of relative position, so higher precision detection of displacement will be possible by correcting wavelength variation amount based on such estimation.

In addition, in one embodiment of the present invention, a polarizing plate may be further arranged between the light source and the birefringent member.

In this way, beam used for detecting displacement may be higher in extinction ratio, so higher precision detection of displacement will be possible.

In addition, in one embodiment of the present invention, an azimuth correction unit for performing azimuth correction to the reflected light may be further arranged at the light receiver for detection of relative position.

In this way, a difference by angular difference of the reflected light transmitted through the polarizing plate will be modified, so higher precision detection of displacement will be possible.

Other embodiment of the present invention is a displacement detection device for optically detecting a displacement in a measuring direction of an object to be measured, comprising: a light source for irradiating light; a light source side beam splitter for splitting the light from the light source into two; a relative position detection means for detecting relative position of the displacement of the object to be measured in the measuring direction based on a change of polarization state of reflected light with respect to one light split by the light source side beam splitter; an absolute position detection means for detecting absolute position of the displacement of the object to be measured in the measuring direction based on a change of light quantity of reflected light with respect to another light split by the light source side beam splitter, wherein the absolute position detection means and the relative position detection means are arranged on in-line with respect to the measuring direction of the object to be measured.

According to other embodiment of the present invention, it is possible to output absolute position information and relative position information of the target surely and precisely, while being capable of corresponding to wide signal period with simple structure, so stable and high precision displacement detection is possible.

Here, in other embodiment of the present invention, the relative position detection means comprises: a target mounted on the object to be measured and irradiated with light from a light source; a light receiver for detection of relative position for receiving light by changing polarization state of reflected light at the target with respect to the light; and a relative position information output unit for outputting relative position information based on the displacement of the target in the measuring direction based on a change of polarization state of the reflected light received at the light receiver for detection of relative position, wherein the target comprises: a reflector mounted on the object to be measured; and a birefringent member provided on the reflector and having a thickness changing from a tip to a base end along the measuring direction, the birefringent member may be configured such that tip side of a bottom surface is rotatable with respect to the reflector with base end side of the bottom surface as a center.

In this way, a period of incremental signal showing relative position information of the target is determined by arrangement and inclination of the birefringent member, so it is possible to correspond to wide signal period with simple structure.

In addition, in other embodiment of the present invention, the light receiver for detection of relative position may detect a change of polarization state of the reflected light along with movement of the target in the measuring direction, and the relative position information output unit may output the relative position information of the target based on a signal obtained by photoelectric conversion of a change of polarization state of the reflected light.

In this way, it is possible to output the relative position information of the target surely and precisely while being capable of corresponding to wide signal period with simple structure, so stable and high precision detection of displacement will be possible.

In addition, in other embodiment of the present invention, the absolute position detection means comprises: a prism mounted on the object to be measured and irradiated with the light from the light source via a mirror; a light receiver for detection of absolute position for receiving light by changing light quantity of reflected light at the prism with respect to the light; an absolute position information output unit for outputting absolute position information based on displacement of the prism in the measuring direction based on a change of the light quantity of the reflected light received at the light receiver for detection of absolute position, wherein at top surface side of the prism, a variable reflection film, in which reflection characteristic varies along the measuring direction, may be provided.

In this way, it is possible to output the absolute position information of the target surely and precisely while being capable of corresponding to wide signal period with simple structure, so stable and high precision detection of displacement will be possible.

As explained in the above, according to the present invention, a period of incremental signal showing relative position information of the target is determined by arrangement and inclination of the birefringent member, so it is possible to correspond to wide signal period with simple structure. In addition, it is possible to output the relative position information of the target surely and precisely while being capable of corresponding to wide signal period with simple structure, so stable and high precision detection of displacement will be possible.

DETAILED DESCRIPTION OF THE INVENTION

Hereinafter, it is explained in detail about preferred embodiments of the present invention. In addition, the embodiments of the present invention explained in the below should not unjustly limit the content of the present invention described in claims, and not all of the features explained in the embodiments of the present invention are necessary as means for solving the problem of the present invention. Also, figurations of various lenses described in the following explanation may be any kind of figuration as long as it is having prescribed imaging performance, and it may be a single lens or a group of lenses with spherical surface or aspherical surface, or it may be a diffraction grating having imaging function.

Figure 1:
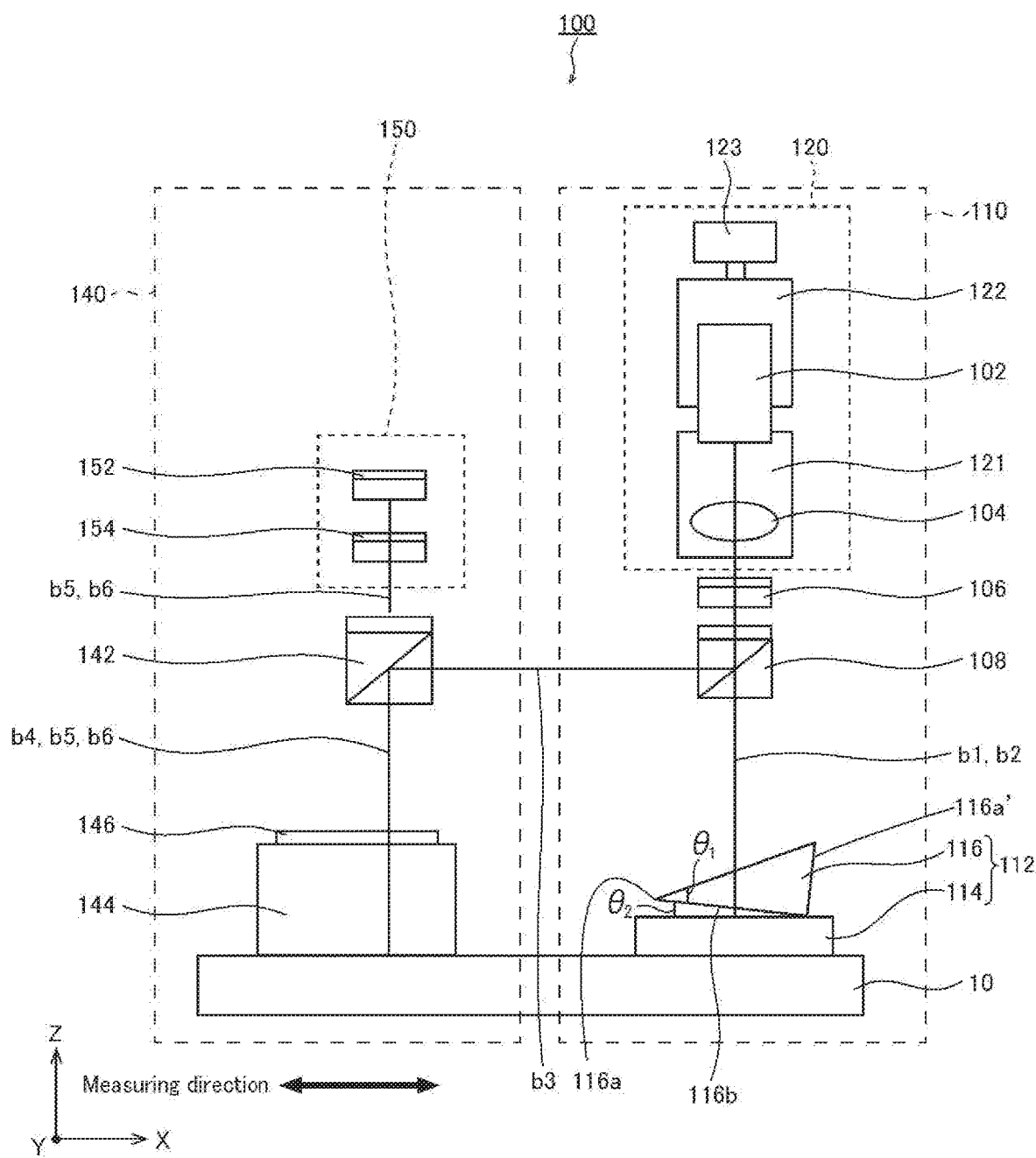
FIG. 1 is a front view illustrating an outline of a structure of a displacement detection device relating to one embodiment of the present invention.

At first, explaining about the configuration of a displacement detecting device relating to one embodiment of the present invention, by using drawings. FIG. 1 is a front view illustrating an outline of a structure of a displacement detection device relating to one embodiment of the present invention, and FIG. 2 is a plan view illustrating an outline of a structure of the displacement detection device relating to one embodiment of the present invention.

A displacement detecting device 100 relating to one embodiment of the present invention is a device for optically detecting relative position and absolute position of displacement of an object 10 to be measured in a measuring direction (X direction). The absolute position described here indicates position information, in which change of received light quantity by displacement of the object 10 to be measured from reference point to the measuring direction (X direction) is converted to absolute value such as voltage, and relative position indicates position information, in which periodic signal such as voltage is phase converted by receiving change of polarized light.

Figure 2:
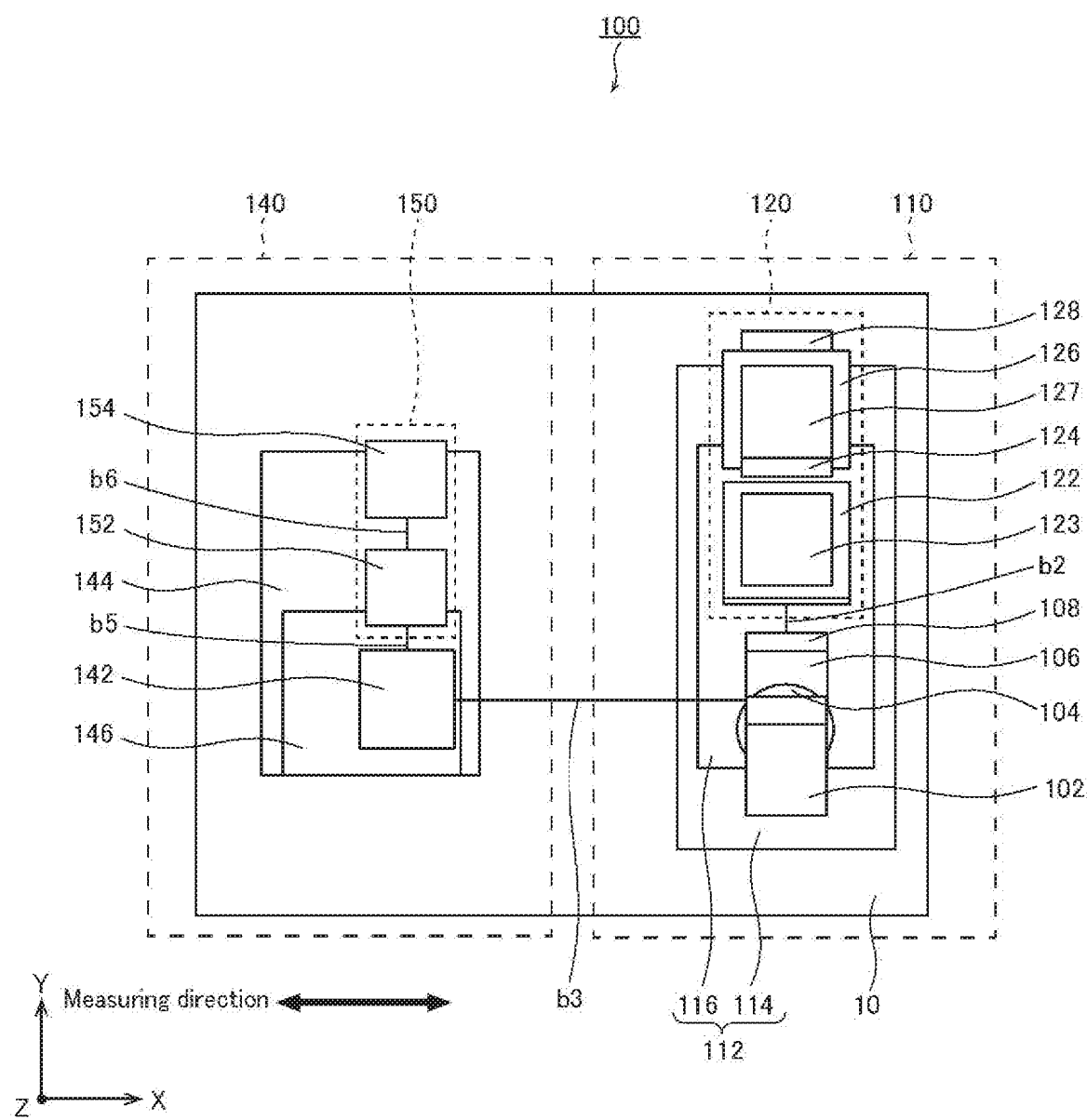
FIG. 2 is a plan view illustrating an outline of a structure of the displacement detection device relating to one embodiment of the present invention.

As illustrated in FIGS. 1 and 2, the displacement detection device 100 of this embodiment comprises: a light source 102; a light source side beam splitter 108; a relative position detection means 110; and an absolute position detection means 140. And, in the displacement detection device 100 of this embodiment, the absolute position detection means 140 and the relative position detection means 110 are arranged on in-line with respect to the measuring direction (X direction) of the object 10 to be measured.

The light source 102 may emit coherent light with limited coherent distance. In this embodiment, as the light source 102, a coherent light source such as multi-mode semiconductor laser, super luminescent diode, or the like, with relatively short coherent distance, is used. However, the light source 102 is not limited to these specific types of light source.

In addition, in this embodiment, polarized light is used as light emitted from the light source 102, so at output stage side of the light source 102, a first lens 104 composed of collimate lens and a polarizer 106 are arranged. As such, a light emitted from the light source 102 becomes collimate light via the first lens 104, and converted into a certain linearly polarized light by using the polarizer 106.

In addition, as a position of the light source 102, it may be placed at a position of the light source 102 illustrated in FIG. 1, or the light source 102 may be arranged in separate place, in order to avoid influence of heat generation of the light source 102, and a light may be propagated using an optical fiber, and an emitting end of the optical fiber may be placed at a position of the light source 102 illustrated in FIG. 1. Also at this time, a divergent light beam emitted from the optical fiber is converted into collimate beam by a collimate lens. In addition, when a beam from the light source is a linearly polarized light, an optical fiber capable of holding polarization plane such as a polarization maintaining fiber is used as the optical fiber.

The light source side beam splitter 108 is a non-polarizing beam splitter without polarization dependence for splitting coherent light from the light source 102 into two. In this embodiment, as illustrated in FIGS. 1 and 2, the light source side beam splitter 108 splits light b1 from the light source 102 into a direction toward the absolute position detection means 140 and a direction directly entering into a target 112 provided in the relative position detection means 110.

The relative position detection means 110 is having a function to detect relative position of displacement of the object 10 to be measured in the measuring direction based on a change of polarization state of reflected light b2 with respect to one light b1 split by the light source side beam splitter 108. In this embodiment, the relative position detection means 110 comprises: a target 112; a light receiver for detection of relative position 120; and a relative position information output unit 130 (refer to FIG. 4).

The target 112 is mounted on the object 10 to be measured, and the light b1 from the light source 102 is irradiated. The target 112 comprises a plate-shaped reflector 114 mounted on the object 10 to be measured and a birefringent member 116 provided on the reflector 114, in which a thickness of the birefringent member 116 is changed to be increased from a tip 116a to a base end 116a' along the measuring direction. And, the birefringent member 116 is configured such that tip side of a bottom surface 116b is rotatable with respect to the reflector 114 with base end side of the bottom surface 116b as a center. In other words, in the birefringent member 116, an angle $\theta_2$ between the bottom surface 116b of the birefringent member 116, in which the tip 116a is having an angle $\theta_1$, and the reflector 114 may be configured to be adjustable.

The light receiver for detection of relative position 120 receives light by changing polarization state of the reflected light b2 at the target 112 with respect to coherent light b1. In this embodiment, the light receiver for detection of relative position 120 comprises: a beam splitter 121; a first polarizing beam splitter 122; a first light receiving element 123; a second light receiving element 124, a quarter wavelength plate 125 (refer to FIG. 3); a second polarizing beam splitter 126; a third light receiving element 127; and a fourth light receiving element 128. A signal showing a change of polarization state of the reflected light b2 received by the light receiver for detection of relative position 120 will be transmitted to a relative position information output unit 130 (refer to FIG. 4), and the relative position information output unit 130 outputs relative position information based on displacement of the target 112 in the measuring direction based on the signal. In addition, about details of the target 112, the light receiver for detection of relative position 120, and the relative position information output unit 130 provided in the relative position detection means 110, it will be described later.

An absolute position detection means 140 is having a function to detect absolute position of displacement of the object 10 to be measured in the measuring direction based on a change of light quantity of reflected light b5, b6 with respect to other light b3, b4 split by the light source side beam splitter 108. In this embodiment, the absolute position detection means 140 comprises: a prism 144 provided with variable reflection film 146 at top surface side; a mirror 142 for introducing other light b3 split by the light source side beam splitter 108 to the prism 144; a light receiver for detection of absolute position 150; and an absolute position information output unit 160 (refer to FIG. 6C).

The light receiver for detection of absolute position 150 receives light by changing light quantity of the reflected light b5, b6 of the object 10 to be measured and prism 144 with respect to the reflected light b4 at the mirror 142. In this embodiment, the light receiver for detection of absolute position 150 comprises a fifth light receiving element 152 and a sixth light receiving element 154. A signal showing a change of light quantity of the reflected light b5, b6 received by the light receiver for detection of absolute position 150 will be transmitted to the absolute position information output unit 160 (refer to FIG. 6C), and the absolute position information output unit 160 outputs absolute position information based on displacement of the prism 144 in the measuring direction based on the signal. In addition, about details of the prism 144, the light receiver for detection of absolute position 150, and the absolute position information output unit 160 provided in the absolute position detection means 140, it will be described later.

Figure 3:
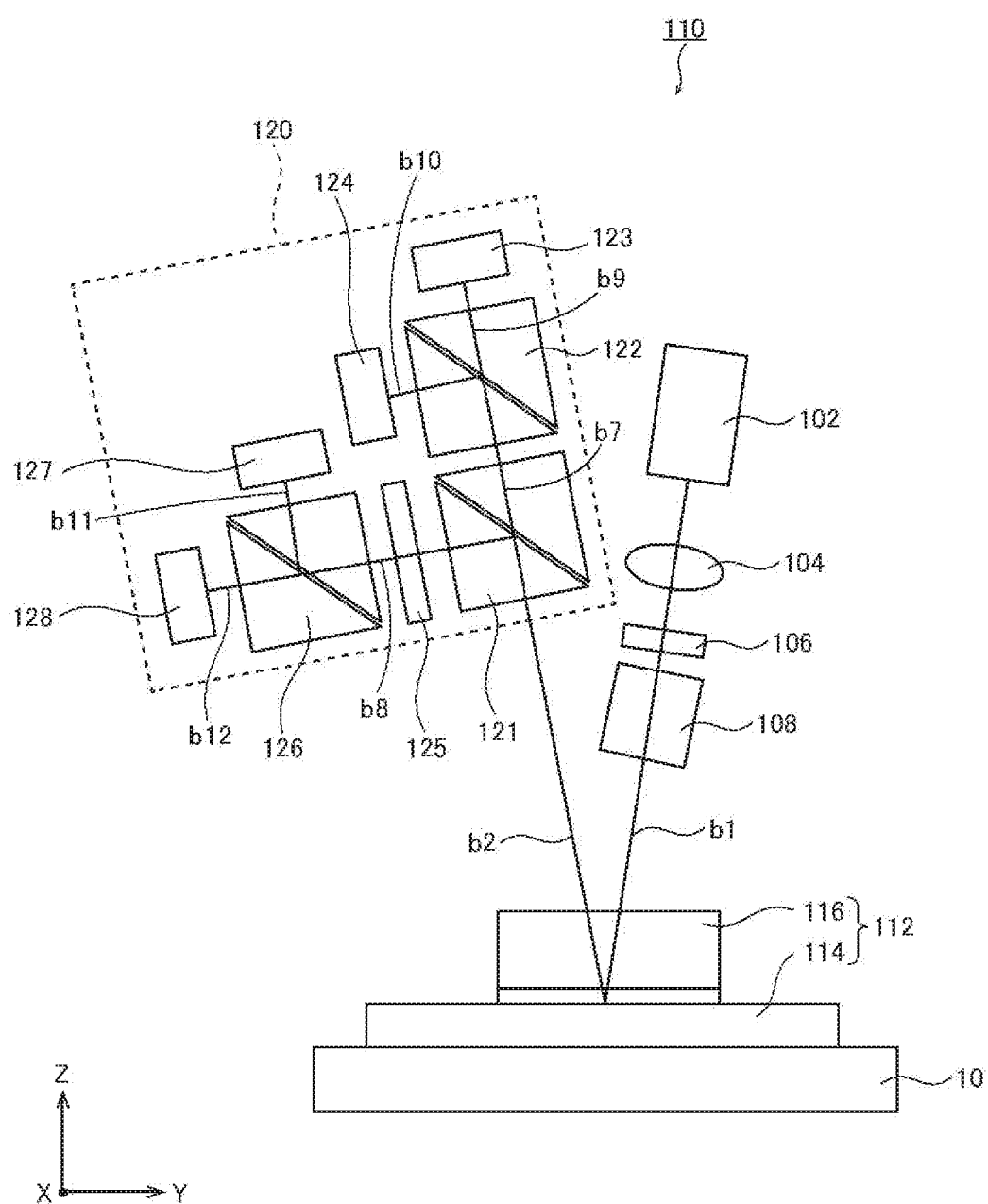
FIG. 3 is a side view illustrating an outline of a structure of a relative position detection means provided in the displacement detection device relating to one embodiment of the present invention.
Figure 4:
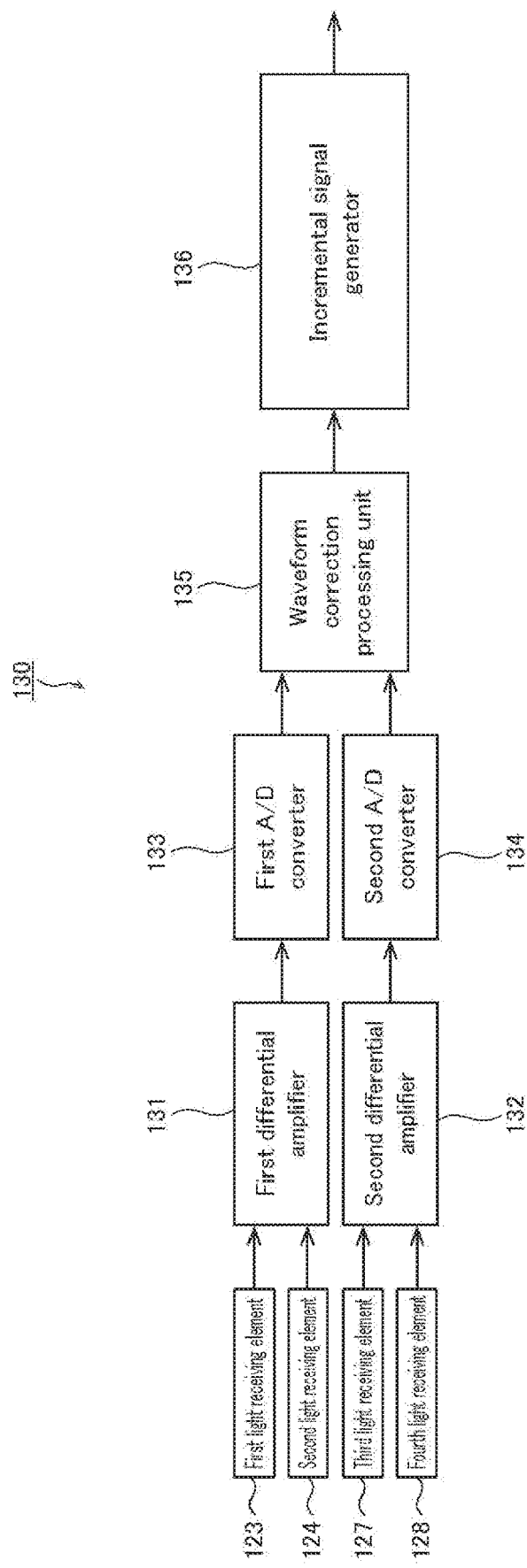
FIG. 4 is a block diagram illustrating a structure of a relative position information output unit provided in the relative position detection means relating to one embodiment of the present invention.

Next, explaining about a structure of the relative position detection means provided in the displacement detection device relating to one embodiment of the present invention, by using drawings. FIG. 3 is a side view illustrating an outline of a structure of a relative position detection means provided in the displacement detection device relating to one embodiment of the present invention, and FIG. 4 is a block diagram illustrating a structure of a relative position information output unit provided in the relative position detection means relating to one embodiment of the present invention.

As mentioned in the above, the relative position detection means 110 is having a function to detect relative position of displacement of the object 10 to be measured in the measuring direction based on a change of polarization state of the reflected light b2 with respect to one light b1 split by the light source side beam splitter 108. In this embodiment, the relative position detection means 110 comprises: the target 112; the light receiver for detection of relative position 120; and the relative position information output unit 130.

In this embodiment, in the relative position detection means 110, the light receiver for detection of relative position 120 detects a change of polarization state of reflected light along with movement of the target 112 in the measuring direction, and the relative position information output unit 130 outputs relative position information of the target 112 based on a signal obtained by photoelectric conversion of a change of polarization state of the reflected light.

The target 112 is mounted on the object 10 to be measured, and functions as target of detection of displacement of the object 10 to be measured. At the target 112, coherent light b1 from the light source 102 is irradiated via the light source side beam splitter 108 after converted into a certain linearly polarized light via the first lens 104 and the polarizer 106.

In this embodiment, the target 112 comprises a plate-shaped reflector 114 mounted on the object 10 to be measured and an approximately triangular prism shaped birefringent member 116 provided on the reflector 114, in which a thickness of the birefringent member 116 is increased from a tip 116a to a base end 116a' along the measuring direction. And, the birefringent member 116 is configured such that tip side of a bottom surface 116b is rotatable with respect to the reflector 114 with base end side of the bottom surface 116b as a center. In other words, in the birefringent member 116, an angle $\theta_2$ between the bottom surface 116b of the birefringent member 116, in which the tip 116a is having an angle $\theta_1$, and the reflector 114 may be configured to be adjustable.

The light receiver for detection of relative position 120 is having a function to receive light by changing polarization state of the reflected light b2 at the target 112 with respect to the light b1. In this embodiment, the light receiver for detection of relative position 120 comprises: a beam splitter 121; a first polarizing beam splitter 122; a first light receiving element 123; a second light receiving element 124, a quarter wavelength plate 125; a second polarizing beam splitter 126; a third light receiving element 127; and a fourth light receiving element 128.

The beam splitter 121 is a non-polarizing beam splitter without polarization dependence for splitting the reflected light b2 reflected by the reflector 114 into two. The first polarizing beam splitter 122 is a polarizing beam splitter for transmitting P component and reflecting S component of one reflected light b7 split by the beam splitter 121. The first light receiving element 123 is a light receiving element composed of photodiode or the like for photoelectric conversion by receiving transmitted light b9 of the first polarizing beam splitter 122. The second light receiving element 124 is a light receiving element composed of photodiode or the like for photoelectric conversion by receiving reflected light b10 of the first polarizing beam splitter 122. The second polarizing beam splitter 126 is a polarizing beam splitter for transmitting P component and reflecting S component of another reflected light b8 split by the beam splitter 121. The quarter wavelength plate 125 is interposed between the beam splitter 121 and the second polarizing beam splitter 126, and having a function to deviate a phase of the reflected light b8 for quarter wavelength. The third light receiving element 127 is a light receiving element composed of photodiode or the like for photoelectric conversion by receiving reflected light b11 of the second polarizing beam splitter 126. The fourth light receiving element 128 is a light receiving element composed of photodiode or the like for photoelectric conversion by receiving transmitted light b12 of the second polarizing beam splitter 126.

A signal showing a change of polarization state of the reflected light b2 received by the light receiver for detection of relative position 120 is transmitted to the relative position information output unit 130, and the relative position information output unit 130 outputs relative position information based on displacement of the target 112 in the measuring direction based on the signal. As illustrated in FIG. 4, the relative position information output unit 130 comprises: a first differential amplifier 131; a second differential amplifier 132; a first A/D converter 133; a second A/D converter 134; a waveform correction processing unit 135; and an incremental signal generator 136.

An input end of the first differential amplifier 131 is connected to the first light receiving element 123 and the second light receiving element 124 of the light receiver for detection of relative position 120, and an output end of the first differential amplifier 131 is connected to the first A/D converter 133. In addition, an input end of the second differential amplifier 132 is connected to the third light receiving element 127 and the fourth light receiving element 128 of the light receiver for detection of relative position 120, and an output end of the second differential amplifier 132 is connected to the second A/D converter 134. And, the first A/D converter 133 and the second A/D converter 134 are connected to waveform correction processing unit 135. The waveform correction processing unit 135 is connected to the incremental signal generator 136.

The relative position information output unit 130 is having a function to output displacement information of the target 112 based on intensity of light received by the light receiver for detection of relative position 120. Concretely, in the relative position information output unit 130, at first, signals from the first light receiving element 123 and the second light receiving element 124 composed of photodiodes are amplified at prescribed amplification factor $\alpha$ by the first differential amplifier 131, and signals from the third light receiving element 127 and fourth light receiving element 128 are amplified at prescribed amplification factor $\beta$ by the second differential amplifier 132. The amplification factors $\alpha$ and $\beta$ are set to be in inputtable range of following A/D converters 133 and 134, and to equalize amplitudes of two signals after amplification.

Two signals obtained by amplified by the differential amplifiers 131 and 132 are digitized from analog sin and cos signals to digital signals by the A/D converters 133 and 134, and arithmetic processing is performed by the waveform correction processing unit 135. In the waveform correction processing unit 135 and the incremental signal generator 136, calculation is performed by programmable logic device or the like incorporated with DSP, and correction of phase fluctuation, offset fluctuation and amplitude fluctuation of sin θ signal and cos θ signal caused by turbulence of analog signal is performed. By calculating θ=A tan θ from corrected signal, position information with more accurate scale is generated, and it is possible to generate incremental signal with necessary form.

In this embodiment, polarized beam is irradiated to the target 112 comprising the birefringent member 116, a thickness of which is changed along the measuring direction, and by the movement of the target 112 in the measuring direction, it is possible to change polarization state of a beam reflected from the target 112. And, the relative position information output unit 130 detects a change of the polarization state by four light receiving elements 123, 124, 127 and 128, and a phase of incremental signal is calculated based on signals from the four light receiving elements 123, 124, 127 and 128 converted by photoelectric conversion, and relative position information of the target moving in the measuring direction is output by the incremental signal generator 136.

At this time, by adjusting an angle $\theta_1$ of a tip 116a of the birefringent member 116 and an angle $\theta_2$ between a bottom surface 116b of the birefringent member 116 and the reflector 114, it is possible to determine a signal period of incremental signal to a prescribed size freely. Therefore, it is possible to output the relative position information of the target 112 surely and precisely while being capable of corresponding to wide signal period with simple structure, so stable and high precision detection of displacement of the object to be measured 10 will be possible.

Figure 5A:
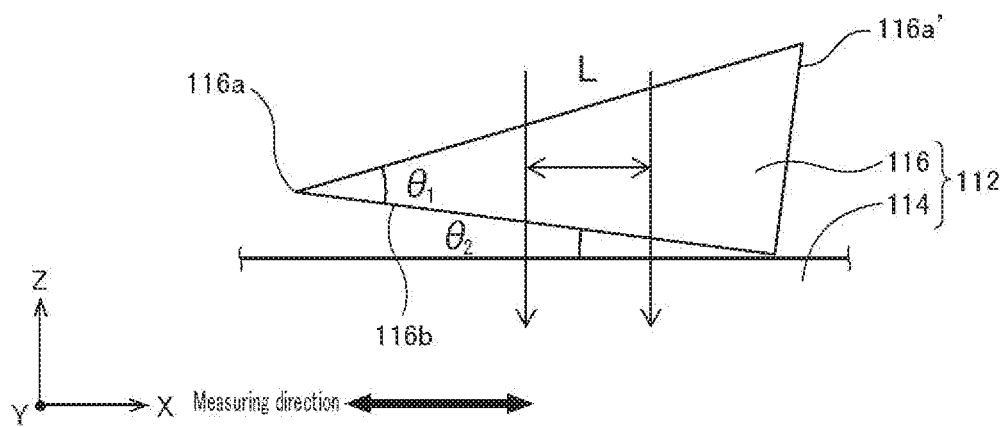
FIG. 5A is an explanatory drawing illustrating a measuring principle by a birefringent member of the relative position detection means relating to one embodiment of the present invention.
Figure 5B:
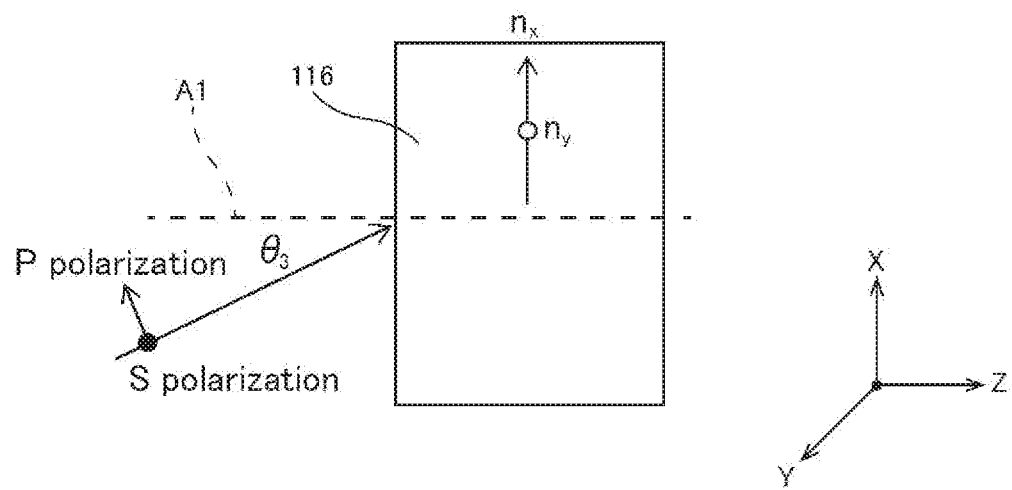
FIG. 5B is an explanatory drawing regarding a crystal axis of the birefringent member.

Next, explaining about an operation of a relative position detection means relating to one embodiment of the present invention, using the drawings. FIG. 5A is an explanatory drawing illustrating a measuring principle by a birefringent member of the relative position detection means relating to one embodiment of the present invention, and FIG. 5B is an explanatory drawing regarding a crystal axis of the birefringent member.

In the relative position detection means 110, moving amount L of the target 112 is detected by observing polarization state of light beam. Concretely, as illustrated in FIG. 5A, a light is transmitted to the birefringent member 116 having different thickness by a location to be transmitted, and phase difference is given to P polarized light and S polarized light. The phase difference is converted to variation of light quantity by unillustrated polarizer, and moving amount L is detected.

At this time, optical path difference of P polarized light and S polarized light is represented by d, refractive index difference of P polarized light and S polarized light is represented by $\Delta n$, wavelength of light source is represented by $\lambda$, and phase difference $\Delta\varphi$ is represented by following formula (1).

$$\Delta\varphi = 2\pi \times d \times \Delta n / \lambda \qquad (1)$$

As illustrated in FIG. 5A, the angle $\theta_1$ of the tip 116a of the birefringent member 116, the angle $\theta_2$ between the bottom surface 116b of the birefringent member 116 and the reflector 114, and optical path difference d of P polarized light and S polarized light when it is moved only for moving amount L can be represented by following formula (2).

$$d = L(\tan\theta_1 - \tan(\theta_1 - \theta_2)) \qquad (2)$$

It will be $\Delta\varphi = 2\pi$ when it is moved for moving amount L, so by arranging the above formula (1), relational expression of following formula (3) is established.

$$d = \lambda/\Delta n \qquad (3)$$

From the above formulas (1), (2), and (3), relational expression of following formula (4) is established.

$$L = \lambda/(\Delta n \times (\tan\theta_1 - \tan(\theta_1 - \theta_2))) \qquad (4)$$

By the above formula (4), it is understood that moving amount L of the target 112 can be changed to optional size by the angle $\theta_1$ of the tip 116a of the birefringent member 116 and the angle $\theta_2$ between the bottom surface 116b of the birefringent member 116 and the reflector 114. And, as dead path is 0, only phase difference by movement of the target 112 will be detectable.

For example, when material of the birefringent member 116 is crystal, wavelength $\lambda$ of light source is 790 nm, and moving amount L is 100 μm, and if $\theta_1$ is 20 degrees, $\theta_2$ will be 35.895 ... ≈35.9 degrees. In other words, the angles $\theta_1$, $\theta_2$ of the birefringent member 116 can be adjusted according to moving amount L of the target 112, so a pitch of moving amount L of the target 112 will be able to be changed to desired size freely. Therefore, a period of incremental signal showing relative position information of the target 112 can be determined freely.

In addition, the birefringent member 116 is a material with different refractive index by crystal axis (optical axis). Therefore, as illustrated in FIG. 5B, when polarization direction of incident light inclines with respect to crystal axis A1, refractive index will be changed by its inclination angle $\theta_3$. Concretely, regarding refractive index $n_p$ of P polarized light, refractive index $n_s$ of S polarized light, refractive index $n_x$ of the birefringent member in X direction, and refractive index $n_y$ of the birefringent member in Y direction, relational expressions of following formulas (5) and (6) are established respectively.

$$n_s = n_y \qquad (5)$$

$$n_p = \frac{n_x n_y}{\sqrt{n_x^2 \cos^2\theta_3 + n_y^2 \sin^2\theta}} \qquad (6)$$

If $\theta_3 = 0$ degree, P polarized light of incident light will be aligned with X axis of crystal, so it will be $n_p = n_x$, and S polarized light will be $n_s = n_y$ as well. In other words, refractive index difference $\Delta n$ can be changed by incident light into crystal axis A1, so relational expression of following formula (7) is established.

$$\Delta n = n_s - n_p = n_y - \frac{n_x n_y}{\sqrt{n_x^2 \cos^2\theta_3 + n_y^2 \sin^2\theta}} \qquad (7)$$

When assigning refractive index difference $\Delta n$ illustrated in the above formula (7) to the formula (4) illustrating a relation of the angles $\theta_1$, $\theta_2$ and moving amount L of the target 112, relational expression of following formula (8) is established.

$$L = \frac{\lambda}{\left\{\left(n_y - \frac{n_x n_y}{\sqrt{n_x^2 \cos^2\theta_3 + n_y^2 \sin^2\theta_3}}\right) \times (\tan\theta_1 - \tan(\theta_1 - \theta_2))\right\}} \qquad (8)$$

As illustrated in the above formula (8), it is possible to change moving amount L of the target 112 by the angle $\theta_1$ of the tip 116a of the birefringent member 116, the angle $\theta_2$ between the bottom surface 116b of the birefringent member 116 and the reflector 114, and the inclination angle $\theta_3$ of incident light with respect to crystal axis A1. In other words, it is possible to adjust the angles $\theta_1$, $\theta_2$ of the birefringent member 116 and the inclination angle $\theta_3$ of incident light with respect to crystal axis A1 according to moving amount L of the target 112, so it is possible to change a pitch of moving amount L of the target 112 to desired size freely.

Figure 6A:
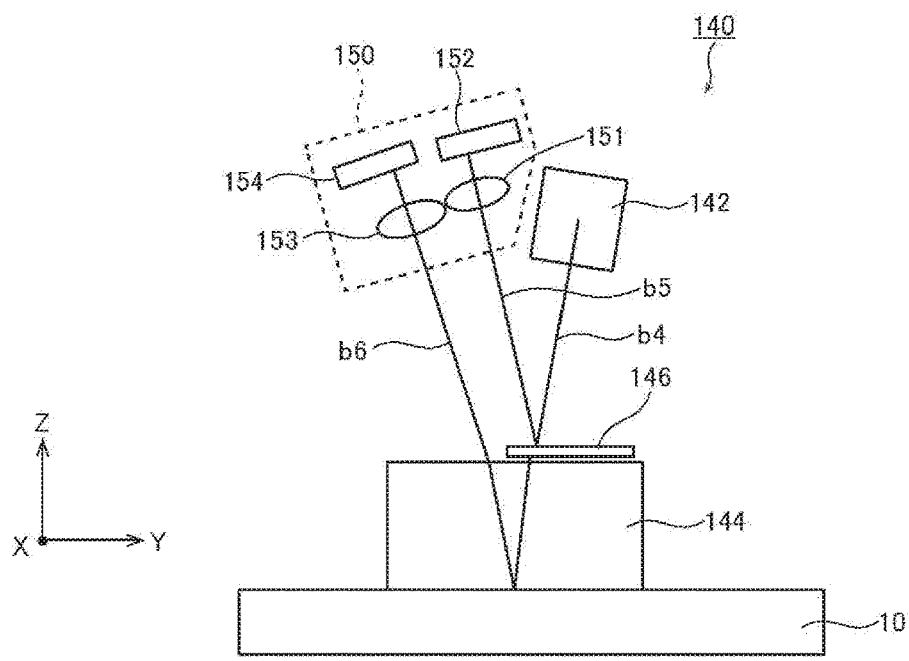
FIG. 6A is a side view illustrating an outline of a structure of an absolute position detection means provided in the displacement detection device relating to one embodiment of the present invention.
Figure 6B:
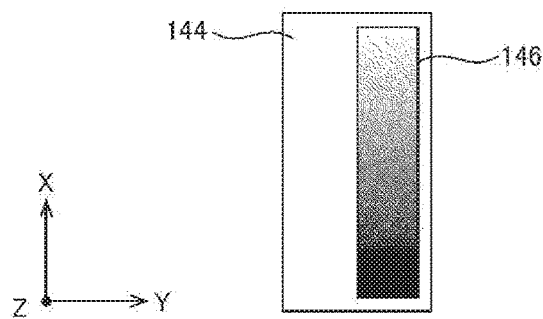
FIG. 6B is a plan view illustrating a structure of a variable reflection film provided in the absolute position detection means.
Figure 6C:
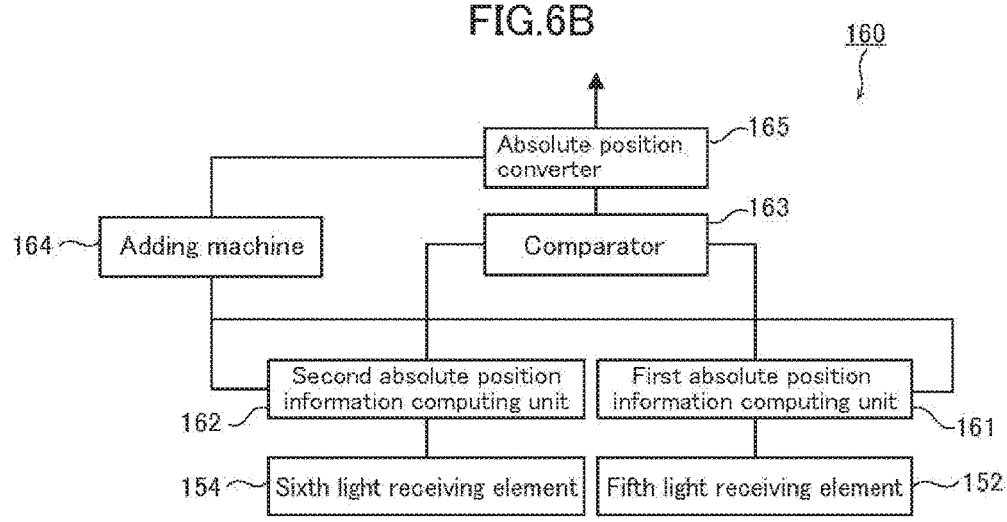
FIG. 6C is a block diagram illustrating a structure of an absolute position information output unit provided in the absolute position detection means.

Next, explaining about a structure of an absolute position detection means provided in the displacement detection device relating to one embodiment of the present invention, using the drawings. FIG. 6A is a side view illustrating an outline of a structure of an absolute position detection means provided in the displacement detection device relating to one embodiment of the present invention, FIG. 6B is a plan view illustrating a structure of a variable reflection film provided in the absolute position detection means, and FIG. 6C is a block diagram illustrating a structure of an absolute position information output unit provided in the absolute position detection means.

An absolute position detection means 140 is having a function to detect absolute position of displacement of the object 10 to be measured in the measuring direction (X direction illustrated in FIGS. 6A and 6B) based on a change of light quantity of reflected light with respect to light split by the light source side beam splitter 108 (refer to FIG. 1). In this embodiment, the absolute position detection means 140 is mounted on the object 10 to be measured and comprises: a prism 144 to which light b4 from the light source 102 is irradiated via a mirror 142; a light receiver for detection of absolute position 150 for receiving light by changing light quantity of reflected light b5 reflected by the prism 144 with respect to the light b4; an absolute position information output unit 160 (refer to FIG. 6C) for outputting absolute position information based on displacement of the prism 144 in measuring direction based on a change of light quantity of reflected light b5, b6 received by the light receiver for detection of absolute position 150.

In this embodiment, as illustrated in FIG. 6A, a target to be irradiated light b4 mounted on the object 10 to be measured is the prism 144 having prescribed thickness, in order to optically detect absolute position information of displacement of the object 10 to be measured in measuring direction. And, as illustrated in FIG. 6B, at top surface side of the prism 144, a variable reflection film 146, in which reflection characteristic varies along the measuring direction (X direction illustrated in FIG. 6B), is provided.

As illustrated in FIG. 6A, the light receiver for detection of absolute position 150 comprises: a fifth light receiving element 152 composed of photodiode or the like for photoelectric conversion by receiving light via a second lens 151 for converging the reflected light b5 reflected by the variable reflection film 146 of the light b4; and a sixth light receiving element 154 composed of photodiode or the like for photoelectric conversion by receiving light via a third lens 153 for converging the reflected light b6 reflected by the object 10 to be measured of the coherent light b4. And, signals obtained by photoelectric conversion at the fifth light receiving element 152 and the sixth light receiving element 154 are transmitted to the absolute position information output unit 160 illustrated in FIG. 6C.

As illustrated in FIG. 6C, the absolute position information output unit 160 comprises: a first absolute position information computing unit 161; a second absolute position information computing unit 162; a comparator 163; an adding machine 164; and an absolute position converter 165. The first absolute position information computing unit 161 converts signal converted by photoelectric conversion at the fifth light receiving element 152 into voltage value. The second absolute position information computing unit 162 converts signal converted by photoelectric conversion at the sixth light receiving element 154 into voltage value. The comparator 163 calculates a difference of position information of the first absolute position information computing unit 161 and the second absolute position information computing unit 162. The adding machine 164 adds output signals of the first absolute position information computing unit 161 and the second absolute position information computing unit 162. The absolute position converter 165 outputs absolute position information and displacement of the prism 144 with variable reflection film 146 in measuring direction X based on information of the comparator 163 and the adding machine 164.

As such, in the absolute position detection means 140 of this embodiment, coherent light b4 entered via the mirror 142 passes through the variable reflection film 146, and one of which is reflected by the variable reflection film 146, and another of which transmits the variable reflection film 146. And, a difference of light quantity between the reflected light b5 reflected by the variable reflection film 146 and the reflected light b6 reflected by the object 10 to be measured after transmitting the variable reflection film 146 is picked by the fifth light receiving element 152 and the sixth light receiving element 154, and it is DC cancelled by finding a differential and subtracting. For example, even if there was a noise or variation of light quantity, it can be cancelled by finding the differential. Therefore, by reading a change of transmittance and reflectance more efficiently, it is possible to surely and precisely output absolute position information of the target, so stable and high precision detection of displacement will be possible.

Figure 7:
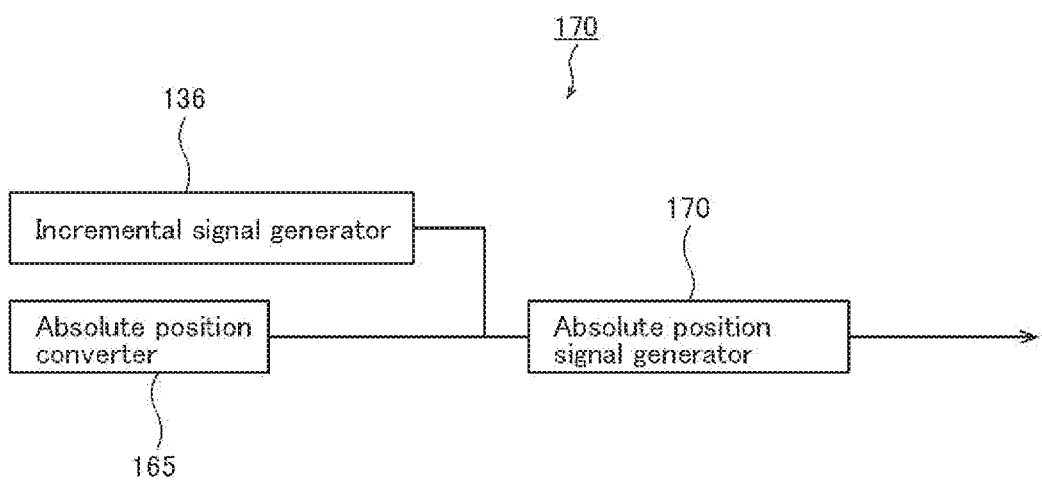
FIG. 7 is a block diagram illustrating an outline of signal output by the displacement detection device relating to one embodiment of the present invention.
Figure 8:
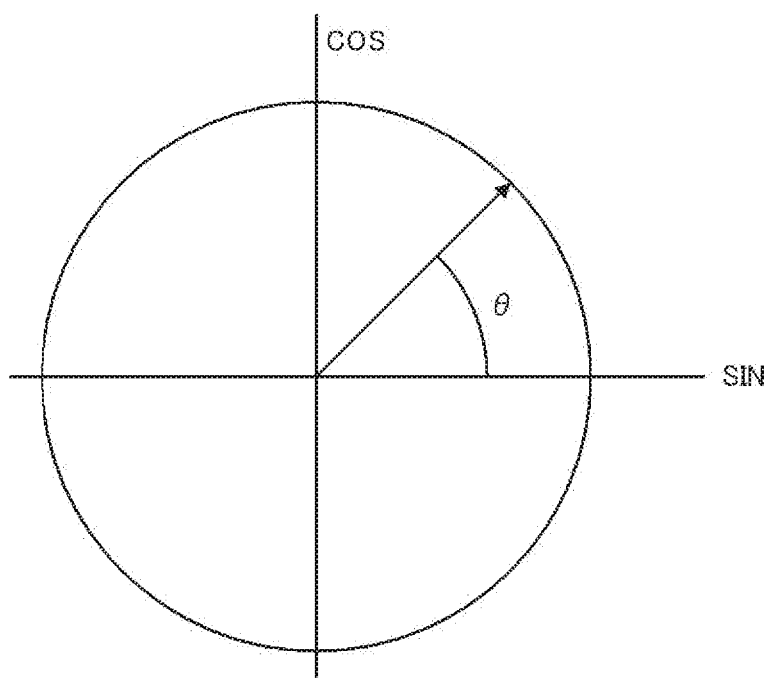
FIG. 8 is an explanatory drawing illustrating an angle of Lissajous signal of an incremental signal generator provided in the relative position detection means relating to one embodiment of the present invention.
Figure 9:
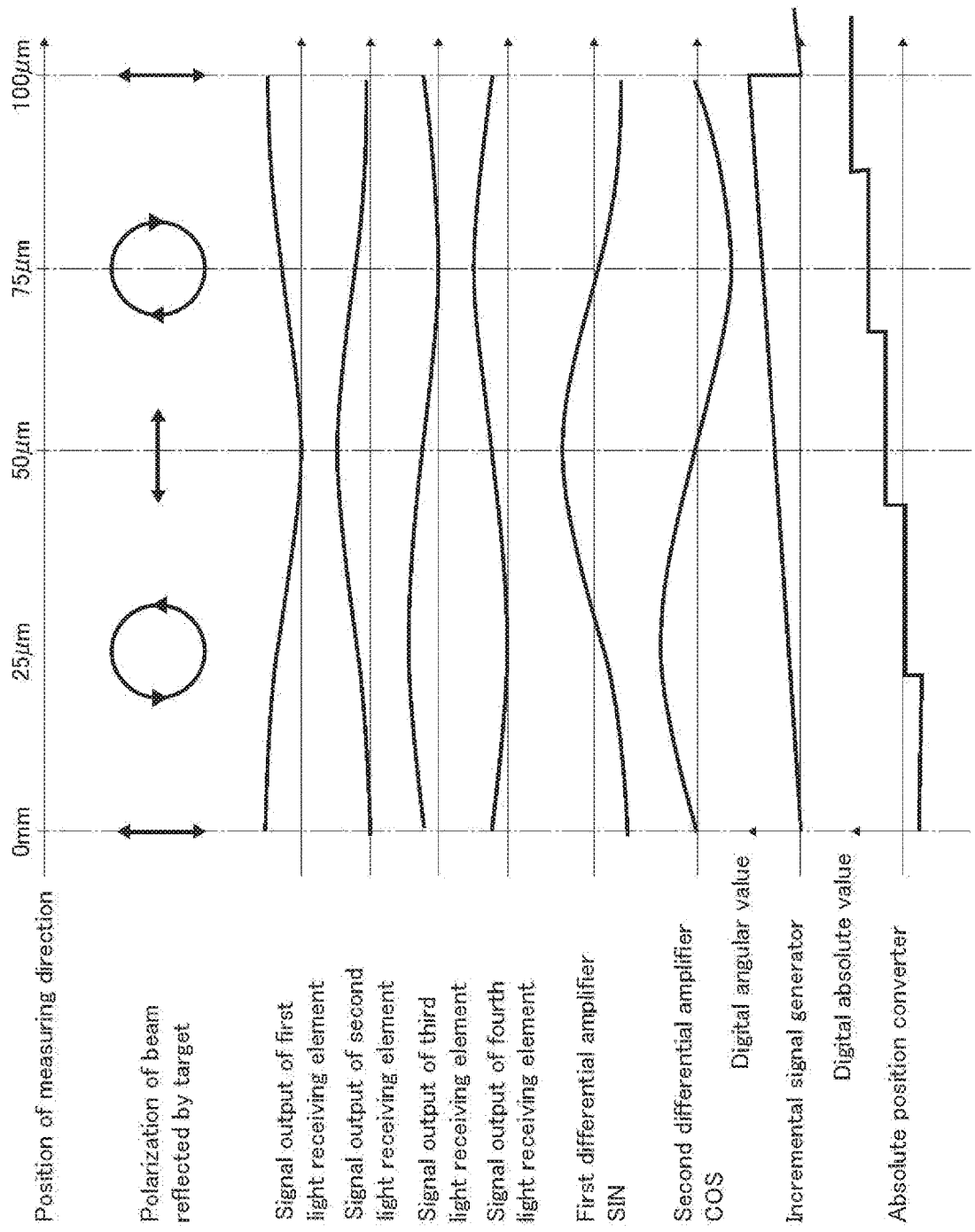
FIG. 9 is a graph illustrating a signal output of each component of the displacement detection device relating to one embodiment of the present invention.

Next, explaining about an operation of displacement detection by the displacement detection device relating to one embodiment of the present invention, using the drawings. FIG. 7 is a block diagram illustrating an outline of signal output by the displacement detection device relating to one embodiment of the present invention. FIG. 8 is an explanatory drawing illustrating an angle of Lissajous signal of an incremental signal generator provided in the relative position detection means relating to one embodiment of the present invention. FIG. 9 is a graph illustrating a signal output of each component of the displacement detection device relating to one embodiment of the present invention.

As illustrated in FIG. 7, in the displacement detection device 100 relating to one embodiment of the present invention, an absolute position signal generator 170 outputs absolute position signal based on absolute position information and displacement of the prism 144 in measuring direction X outputted from the absolute position converter 165, and incremental signal showing relative position information outputted from the incremental signal generator 136.

In the incremental signal generator 136 of the relative position information output unit 130 (refer to FIG. 4), displacement amount and displacement direction of the target 112 is calculated based on signals supplied from the first differential amplifier 131 and the second differential amplifier 132 arranged at front stage side, and incremental signal is generated. At that time, an angle $\theta$ of Lissajous signal illustrated in FIG. 8 is calculated based on the signals supplied from the first differential amplifier 131 (refer to FIG. 4) and the second differential amplifier 132 (refer to FIG. 4).

In this embodiment, SIN obtained by DC cancelling of the first light receiving element 123 and the second light receiving element 124, and COS obtained by DC cancelling of the third light receiving element 127 and the fourth light receiving element 128 are calculated by angle calculation, after A/D converted respectively, to form Lissajous signal illustrated in FIG. 8. Concretely, by writing SIN at x and COS at y respectively, circular Lissajous curve will be depicted, and output of the incremental signal generator 136 depicts a circle illustrated in FIG. 9, by moving the target 112 transversely in measuring direction. This is found by angle of unit time to be displacement information. Such displacement information is outputted as output of the incremental signal generator 136, so angle information of one period 360 degrees is outputted, and also, it is returned to 0 degree to repeat it from 0 degree to 360 degrees continuously.

For example, when it is 100 μm with one period 360 degrees, and when 0 is 0 degree, it will be 0 mm, and when 0 is 90 degrees, it will be 25 and when 0 is 180 degrees, it will be 50 μm. At that time, the incremental signal generator 136 will be able to output relative position by resolution of 100 μm/65536=1.53 nm, by dividing with A/D converter of 16 Bit. On the other hand, the absolute position converter 165 outputs address information of one period 100 μm of incremental signal, and absolute position of digit of high-ranking 100 μm is determined by the absolute position signal generator 170, and it is combined with incremental signal.

In the displacement detection device 100 of this embodiment, by comprising the above relative position detection means 110 and the absolute position detection means 140, when it is designed to be one period 100 μm, as illustrated in FIG. 9, polarization state of beam reflected by the target 112 changes to counterclockwise circular polarization from vertical polarization, and as it progresses further, changes to linear polarization in horizontal direction, and by progressing further, changes to clockwise circular polarization and then returns to vertical polarization, and signal of one period can be found.

In contrast, regarding signal output of the first light receiving element 123 and second light receiving element 124, when output of the first light receiving element 123, through which the reflected lights b2, b7, b9 transmit without any change, is at MAX, output of second light receiving element 124 for receiving reflected light b10 reflected by the first polarizing beam splitter 122 becomes MIN. In other words, when output signal of the first light receiving element 123 is sin curve, output signal of the second light receiving element 124 will be −sin curve.

On the other hand, the reflected light b8 reflected by beam splitter 121 transmits the quarter wavelength plate 125, so regarding signal output of the third light receiving element 127 and the fourth light receiving element 128, it will be cos curve and −cos curve respectively.

In this embodiment, differential of signal output of the first light receiving element 123 and the second light receiving element 124 is found by the first differential amplifier 131, and differential of signal output of the third light receiving element 127 and the fourth light receiving element 128 is found by the second differential amplifier 132, so output signal of the first differential amplifier 131 and the second differential amplifier 132 will be double amplitude respectively. At that time, transverse line of FIG. 9 illustrates OV, and it is DC cancelled. Hereby, it will be changed to OV center even when light quantity is changed, so it will not be error of phase detection. These differential amplified signals become sin curve and cos curve respectively, and it will be angular information of one period 360 degrees by the incremental signal generator 136.

This angular information is found by the above Lissajous signal. For example, when unit of absolute position information is 100 μm, it becomes absolute information of 360 degrees within 100 μm. It will be returned to original state when it exceeds 100 μm, so periodic signal will not be formed, and absolute position detection will not be possible. Here, by finding differential of light coming from a laser at a surface and after transmitted by the absolute position detection means 140, one will be reflected and another will be transmitted. Therefore, this balance will be changing to linear, so when subtracted, it will be a signal in which voltage will be increased gradually. In this embodiment, output signals of these differential amplifiers 131 and 132 are digitally converted by the A/D converters 133 and 134, but by digitally converting a change of voltage and by subtracting, DC cancelled signal is obtained. Therefore, a graph repeating increase of gentle slope in one period is obtained as digital angular value of incremental signal formed by the incremental signal generator 136, and a graph increasing digital absolute value in stages at prescribed interval is obtained as digital absolute value of the absolute position converter 165.

As such, in this embodiment, a cross section of the birefringent member 116 of the target 112 of the relative position detection means 110, in which a thickness changes in the measuring direction, is configured as wedge shape, and also, a tip 116a of the birefringent member 116 is rotatable with respect to a base end 116b, so it is possible to change period of incremental signal to desired size by arrangement and inclination of the birefringent member 116. In other words, it can be changed to desired period by signal period of incremental signal without changing parts as conventionally, so it is possible to output the relative position information of the target surely and precisely while being capable of corresponding to wide signal period with simple structure, so stable and high precision detection of displacement will be possible.

In addition, in this embodiment, two light waves for detecting displacement pass through same light path spatially, so stable and high-precise detection of displacement will be possible without being influenced by disturbance. Further, in this embodiment, the relative position detection means 110 and the absolute position detection means 140 are arranged on in-line with respect to the measuring direction of the object 10 to be measured, so it is possible to output absolute position information surely and precisely based on relative position information of the target while being capable of corresponding to wide period of incremental signal with simple structure, so stable and high precision detection of displacement will be possible, and it is having extremely significant industrial value.

Figures 10A, 10B:
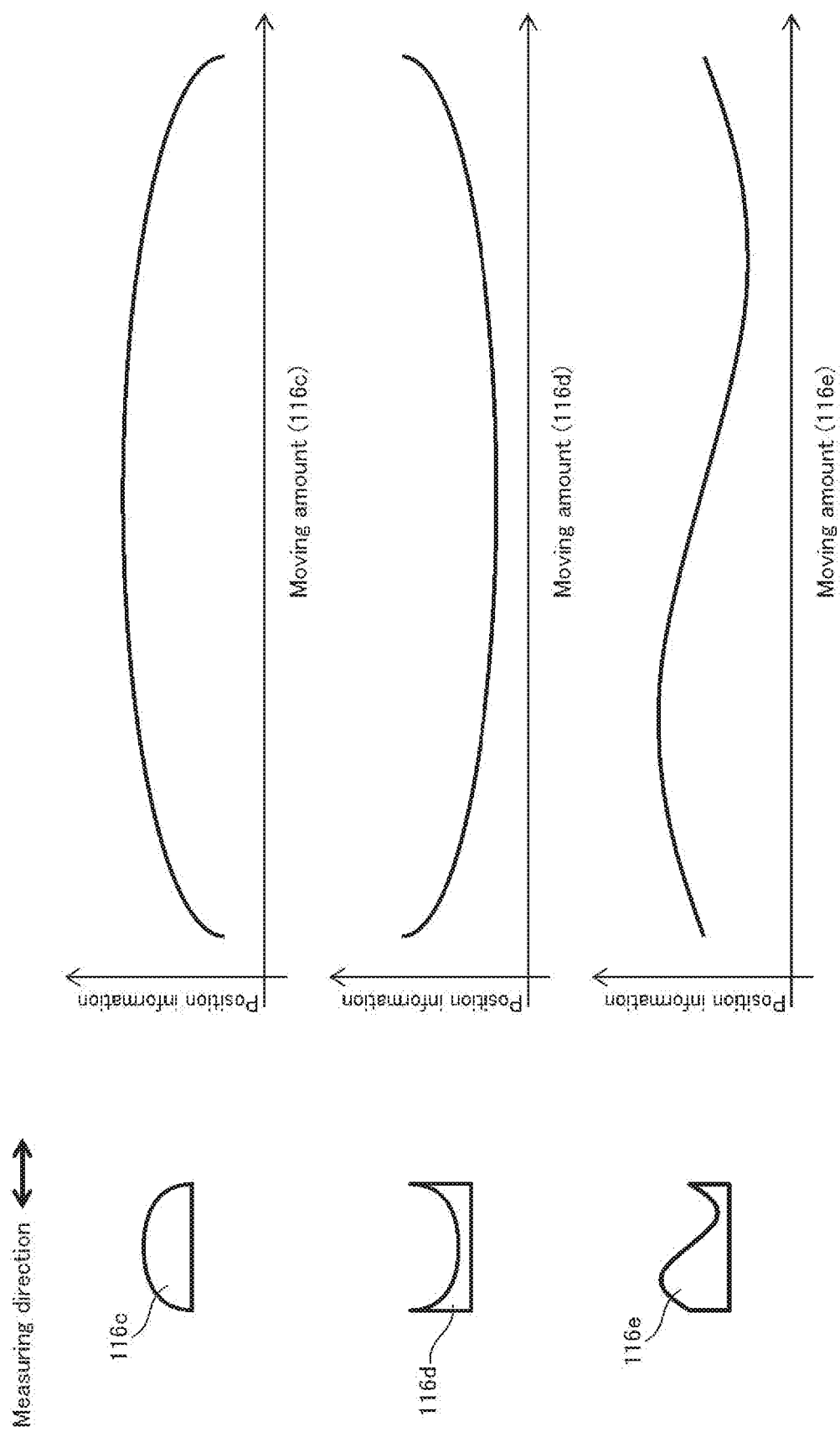
FIG. 10A is an explanatory drawing illustrating examples of modified examples of the birefringent member of the relative position detection means relating to one embodiment of the present invention.
FIG. 10B is a graph illustrating a relation of position information and moving amount of the birefringent member.

In addition, a structure of the birefringent member 116 of the target 112 of the relative position detection means 110 is not limited to triangular prism shape with wedge shaped cross section, as long as it is a shape in which a thickness changes with respect to the measuring direction. For example, as illustrated in FIG. 10A, it may be birefringent member 116c with convex curved shape, or birefringent member 116d with concave curved shape, or birefringent member 116e with sine curved shape. As such, by configuring the birefringent member to a shape in which a thickness changes with respect to the measuring direction, as illustrated in FIG. 10B, position information with respect to moving amount of the measuring direction will be changed along with change of such shape, so it is possible to change a period of incremental signal to desired size by arrangement and inclination of the birefringent member.

Figure 11A:
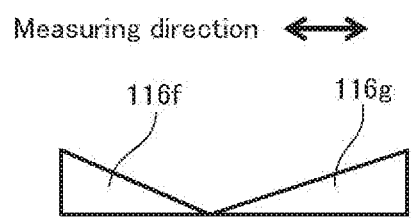
FIGS. 11A and 11B are explanatory drawings illustrating examples of other modified examples of the birefringent member of the relative position detection means relating to one embodiment of the present invention.
Figure 11B:
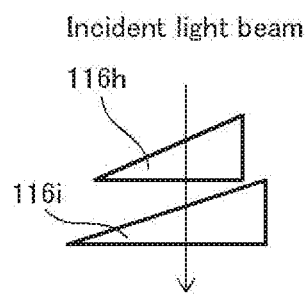

In addition, the birefringent member 116 may be configured from a plurality of different members. For example, as illustrated in FIG. 11A, it may be able to change sensitivity of signal output by measuring location, by configuring such that two birefringent members 116f and 116g are arranged in parallel along the measuring direction. In addition, as illustrated in FIG. 11B, it may be able to change signal period, by configuring such that two birefringent members 116h and 116i are laminated along incident direction of light, i.e. incident light beam direction. As such, by configuring the birefringent member with a plurality of different members, it is possible to easily change a period or sensitivity of signal output showing change of polarization state of reflected light along with movement of the target in the measuring direction with simple structure.

Figure 12A:
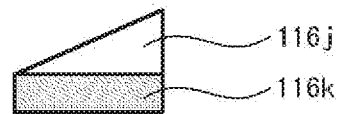
FIGS. 12A to 12C are explanatory drawings illustrating examples of other modified examples of the birefringent member of the relative position detection means relating to one embodiment of the present invention.
Figure 12B:
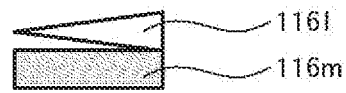
Figure 12C:
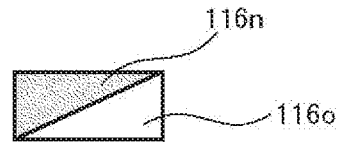

Further, the birefringent member 116 may be configured such that a plurality of members with different crystal axis direction are laminated along incident direction of light, in order to inhibit influence by thermal fluctuation or by wavelength variation of light source. For example, as illustrated in FIG. 12A, other birefringent member 116k having equivalent function with crystal axis being orthogonal to a birefringent member 116j may be superposed on the birefringent member 116j. From this, as crystal axis directions of each birefringent member 116j, 116k are being orthogonal to each other, it is possible to inhibit influence by thermal fluctuation or by wavelength variation of light source. In addition, as illustrated in FIG. 12B, it is possible to inhibit Abbe error by configuring a cross section of a birefringent member 116l to isosceles triangle, and by arranging in-line at the time of measuring at a position of angle center of the isosceles triangle. Further, as illustrated in FIG. 12C, it is possible to inhibit angular deviation of emitted light beam and to decrease thickness of birefringent members 116n and 116o by superposing other birefringent member 116n with same shape and having equivalent function and crystal axis being orthogonal with respect to the birefringent member 116o on the birefringent member 116o. In addition, regarding these functions and effects, equivalent effect can be obtained by configuring following correction prism 129, 229 as same as the above.

Figure 13:
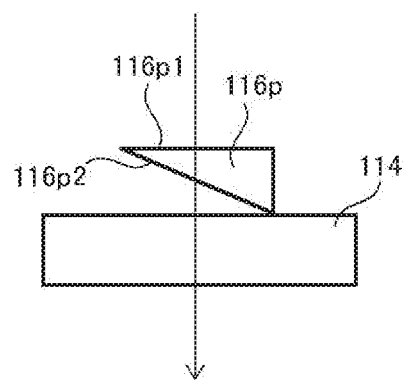
FIG. 13 is an explanatory drawing illustrating an example of other modified example of the birefringent member of the relative position detection means relating to one embodiment of the present invention.

In addition, with respect to the birefringent member 116, a surface to which incident light beam is entered is not limited to inclined surface, and it may be other surface. For example, as illustrated in FIG. 13, when the birefringent member 116p is having a plane surface 116p1 other than inclined surface 116p2, it is possible to inhibit refractive angle of incident light beam, if tip side of the inclined surface 116p2 is arranged on the reflector 114, and if incident light beam enters vertically to the plane surface 116p1 arranged at upper side, so it is effective to high precision measurement.

In addition, it may be configured as other structure as long as the displacement detection device 100 provided with the relative position detection means 110 relating to one embodiment of the present invention is having a structure such that the absolute position detection means 140 and the relative position detection means 110 are arranged on in-line with respect to the measuring direction of the object 10 to be measured.

Figure 14:
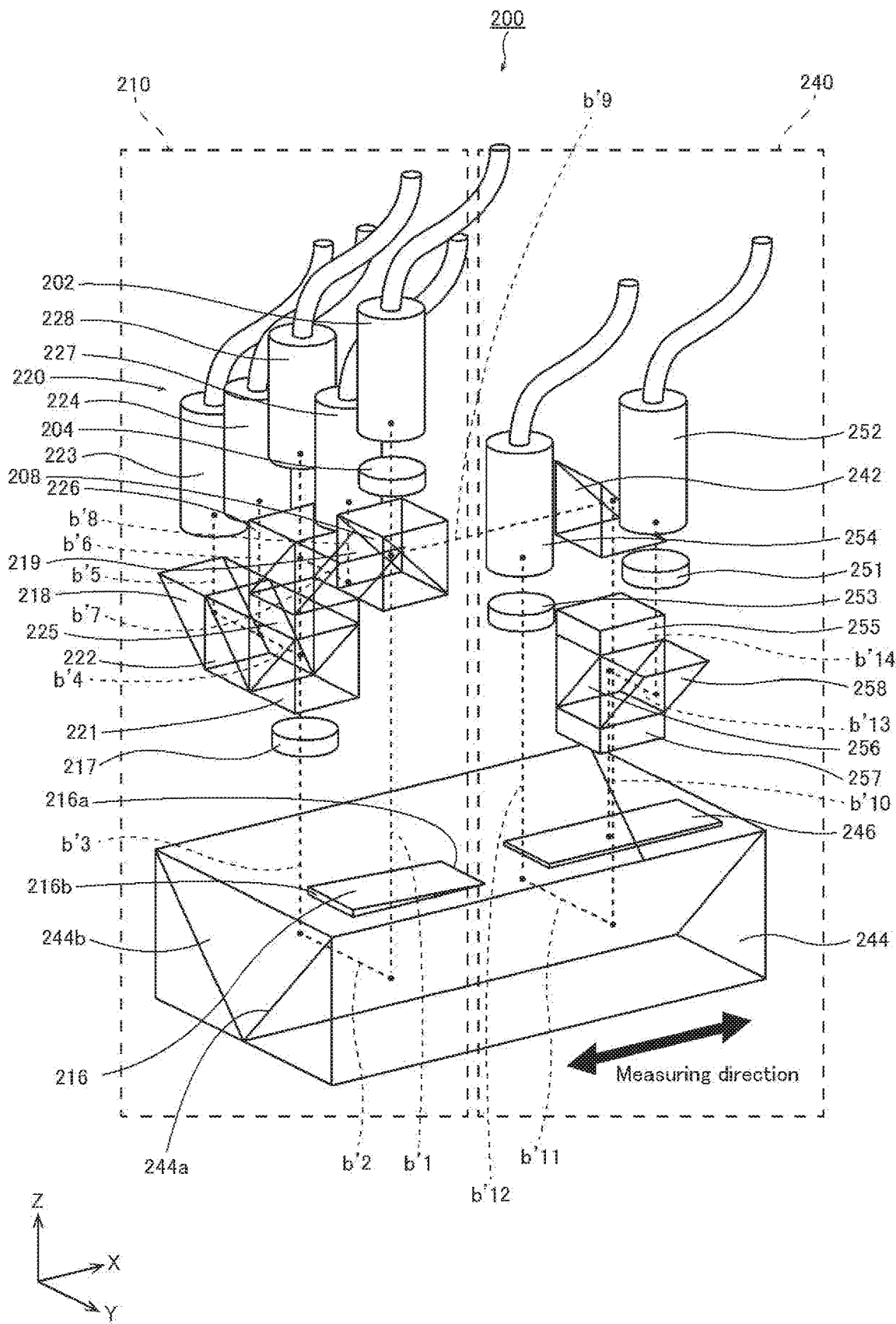
FIG. 14 is a perspective view illustrating an outline of a structure of modified example of the displacement detection device relating to one embodiment of the present invention.

For example, as illustrated in FIG. 14, the reflector mounted on the object to be measured may be prism 244 with reflection film, which is common for absolute position detection means 240 and relative position detection means 210. As illustrated in FIG. 14, the prism 244 with reflection film provided in a displacement detection device 200 relating to this modified example is having a box shape, and prism surfaces 244a and 244b, cross section of which is having approximately V shape, are arranged inside. And, at top surface side of the prism 244 with reflection film, a birefringent member 216 and a variable reflection film 246 are arranged on in-line (coaxially) along the measuring direction. The birefringent member 216 and the variable reflection film 246 may not be arranged on in-line, but in this case, there is a risk that Abbe error occurs to absolute position detection and relative position detection by posture change of the object to be measured, so it is preferable to arrange them on in-line. In addition, structure and function of the birefringent member 216 and the variable reflection film 246 are same as which provided in the displacement detection device 100 relating to one embodiment of the present invention, so explanation of which are omitted.

In this modified example, in order to enable incident of light in vertical direction at each light receiving element 223, 224, 227, 228, 252, 254, in the relative position detection means 210, a fourth lens 217 is arranged at input stage side of a beam splitter 221 for converging reflected light b'3 of reflected light b'2 of light b'1 from a light source 202 reflected by the prism 244 with reflection film, and a mirror 218 is arranged at output stage of first light receiving element 223 side of a first polarizing beam splitter 222, and a mirror 219 is arranged at output stage of third light receiving element 227 side of a second polarizing beam splitter 226. On the other hand, as illustrated in FIG. 14, in the absolute position detection means 240, a polarizer 255, a polarizing beam splitter 256, and a quarter wavelength plate 257 are arranged between a mirror 242 and the prism 244 with reflection film, and also, a mirror 258 is arranged at output stage of a fifth light receiving element 252 side of the polarizing beam splitter 256.

As such, in the displacement detection device 200 of this modified example, as well as the displacement detection device 100 relating to one embodiment of the present invention, a cross section of the birefringent member 216 of the target of the relative position detection means 200, in which a thickness changes in the measuring direction, is configured as wedge shape, and also, a tip 216a of the birefringent member 216 is rotatable with respect to a base end 216b, so it is possible to change period of incremental signal to desired size by arrangement and inclination of the birefringent member 216. Therefore, it is possible to output the relative position information of the target surely and precisely while being capable of corresponding to wide signal period with simple structure, so stable and high precision detection of displacement of the object to be measured will be possible.

In addition, the reflector mounted on the object to be measured is prism 244 with reflection film, which is common for the absolute position detection means 240 and the relative position detection means 210, and also, it is configured to enable incident of light in vertical direction at each light receiving element 223, 224, 227, 228, 252, 254, so it is possible to save space of the device, and it is having extremely significant industrial value.

In addition, as illustrated in FIG. 14, in this embodiment, when the light source 202 is introduced by fiber, wavelength variation may be estimated and corrected by measuring a temperature of the light source 202. On the other hand, when the light source 202 is not fiber, and when it is having a shape that LD is included in sensor head part, it will be able to perform similar correction of wavelength variation by arranging a thermometer near LD and sensor head part.

In addition, optical axis of the birefringent member 216 is not always necessary to be parallel or orthogonal to the measuring direction. For example, in the birefringent member 216 having optical axis being parallel or orthogonal to x axis of FIG. 14, when optical axis is rotated for 45 degrees with respect to x axis with z axis as rotation axis, and if the light source 202 is linearly polarized light, the light source 202 and a light receiver for detection of relative position 220 should be inclined for 45 degrees with z axis as rotation axis. On the other hand, when the light source 202 is circular polarized light, it is not necessary to rotate the light source 202. As such, by improving freedom of optical axis, flexible and high precision detection of displacement will be possible.

Further, in this embodiment, in light to be entered from a light source unit (sensor head) to the birefringent member 216 which is a target, polarization state may be circular polarization. When polarization state of incident light is circular polarization, even if azimuth of sensor head is deviated, it is possible to make electrolytic component ratio of ordinary light and extraordinary light in birefringent medium always equivalent.

In addition, as illustrated in FIG. 14, in this embodiment, a quarter wavelength plate 225 is arranged between the beam splitter 221 and the second polarizing beam splitter 226, but the quarter wavelength plate 225 may be removed and arranged just in front of the beam splitter 221. At this time, it is preferable to adjust to be able to obtain +/−sin signals and +/−cos signals, by adjusting azimuth angle of P polarization axis and S polarization axis of PBS of an interference signal detector, and by arranging optical axis of the quarter wavelength plate 225 to be inclined 45 degrees with respect to optical axis of the birefringent member.

Figure 15:
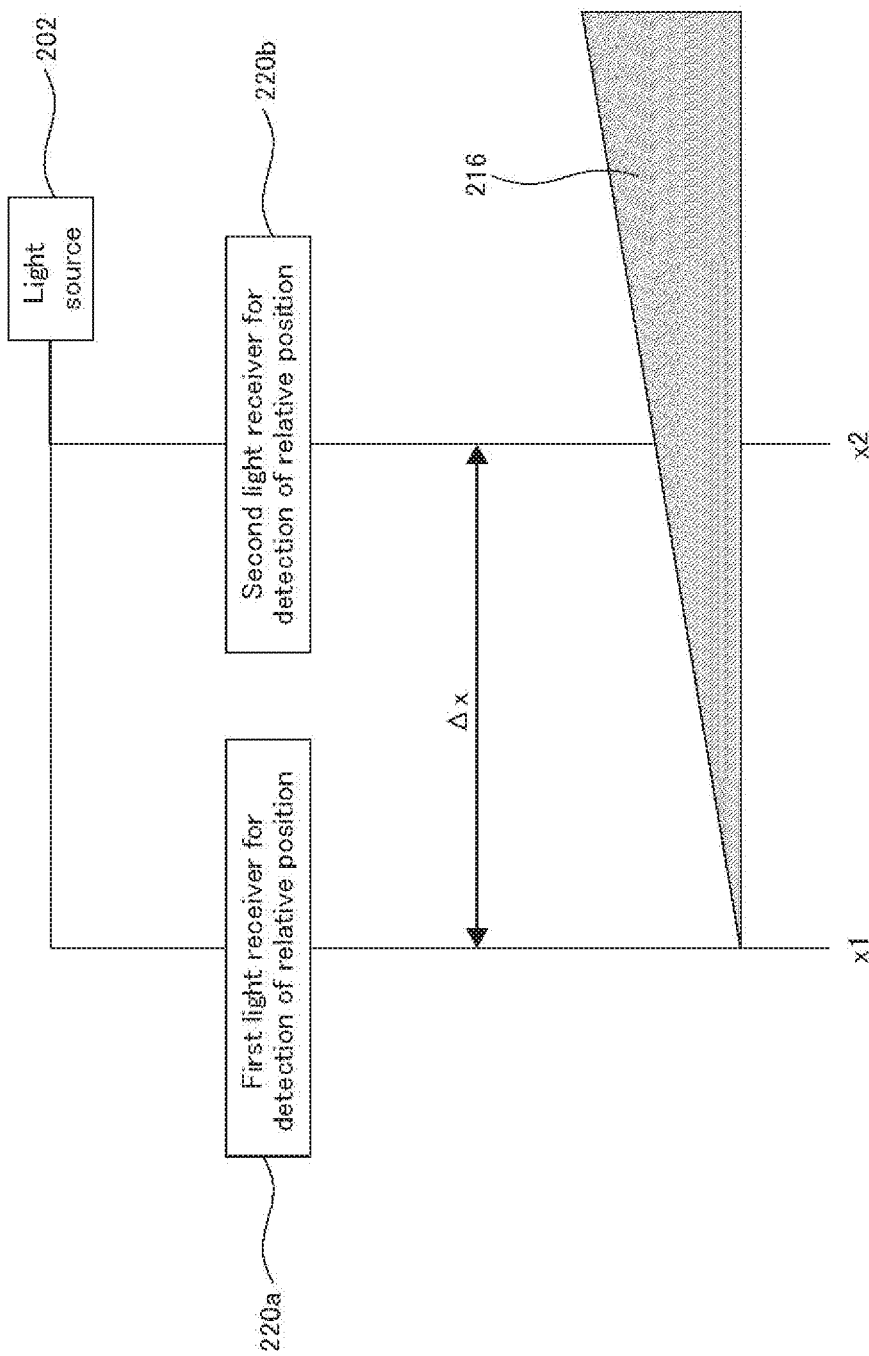
FIG. 15 is an explanatory drawing illustrating an outline of movement and structure of other mode of modified example of the displacement detection device relating to one embodiment of the present invention.

In addition, in the relative position detection means 210 of the displacement detection device 200 illustrated in FIG. 14, one light receiver for detection of relative position 220 for detecting a change of polarization state of reflected light along with movement of the target in the measuring direction is arranged, but two light receivers for detection of relative position 220 may be arranged along the measuring direction. For example, as illustrated in FIG. 15, a first light receiver for detection of relative position 220a and a second light receiver for detection of relative position 220b are arranged in a row along the measuring direction, and two light receivers for detection of relative position 220a and 220b are operated by same light source 202 to obtain phase fluctuation amount at two points of the birefringent member 216, so that wavelength variation amount is estimated and corrected based on difference between two points.

For example, phase difference Φ of ordinary light and extraordinary light by wavelength variation is represented by following formula (9), wherein wavelength of light is λ, a thickness of the birefringent member 216 giving phase difference Φ, when wavelength is λ, is d, and refractive index difference of ordinary light and extraordinary light is Δn.

$$\Phi = \Delta n * d / \lambda \tag{9}$$

A thickness d of the birefringent member 216 giving phase difference Φ, when wavelength is λ, is represented by following formula (10), wherein inclination of slope of the birefringent member 216 is k, and moving amount of the birefringent member 216 in the measuring direction is x.

$$d = k * x \tag{10}$$

Therefore, phase difference ΔΦ1 of ordinary light and extraordinary light detected by the first light receiver for detection of relative position 220a is represented by following formulas (11) to (13), wherein wavelength of light is λ, λ', a thickness of the birefringent member 216 giving phase difference ΔΦ1, ΔΦ'1, when wavelength is λ, λ', is d1, and refractive index difference of ordinary light and extraordinary light is Δn.

$$\Phi 1 = \Delta n * d 1 / \lambda \tag{11}$$

$$\Phi' 1 = \Delta n * d 1 / \lambda' \tag{12}$$

$$\Delta \Phi 1 = \Phi' 1 - \Phi 1 \tag{13}$$

On the other hand, phase difference ΔΦ2 of ordinary light and extraordinary light detected by the second light receiver for detection of relative position 220b is represented by following formulas (14) to (16), wherein wavelength of light is λ, λ', a thickness of the birefringent member 216 giving phase difference ΔΦ2, ΔΦ'2, when wavelength is λ, λ', is d2, and refractive index difference of ordinary light and extraordinary light is Δn.

$$\Phi 2 = \Delta n * d 2 / \lambda \tag{14}$$

$$\Phi' = \Delta n * d 2 / \lambda' \tag{15}$$

$$\Delta \Phi 2 = \Phi' 2 - \Phi 2 \tag{16}$$

By the above formulas (9) to (16), phase difference ΔΦ12 of ordinary light and extraordinary light detected by the first light receiver for detection of relative position 220a and the second light receiver for detection of relative position 220b is illustrated by following formula (17).

$$\Delta \Phi 12 = \Delta n * k * \{(\lambda - \lambda')/\lambda \lambda'\} * \Delta x \tag{17}$$

Therefore, wavelength λ' after modulation is illustrated by following formula (18).

$$\lambda' = \{\Delta n * k * \lambda * \Delta x\} / \{\Delta \Phi 12 * \Delta n * k * \Delta x\} \tag{18}$$

As such, in this embodiment, phase difference of ordinary light and extraordinary light by wavelength variation is proportional to a thickness d of the birefringent member 216, so if Δx and inclination k of the birefringent member 216 is known, it is possible to estimate wavelength variation amount. Therefore, it is possible to estimate wavelength variation amount easily based on difference of phase fluctuation amount of polarization state of reflected light detected by each light receiver for detection of relative position 220a, 220b, so higher precision detection of displacement is possible by correcting wavelength variation amount based on such estimation.

In addition, a shape of the prism 244 with reflection film provided in the displacement detection device 200 relating to modified example of one embodiment of the present invention is not limited to a shape illustrated in FIG. 14. For example, as illustrated in FIG. 16, cross section of a prism 244' with reflection film may be symmetrical hexagonal shape.

Figure 16:
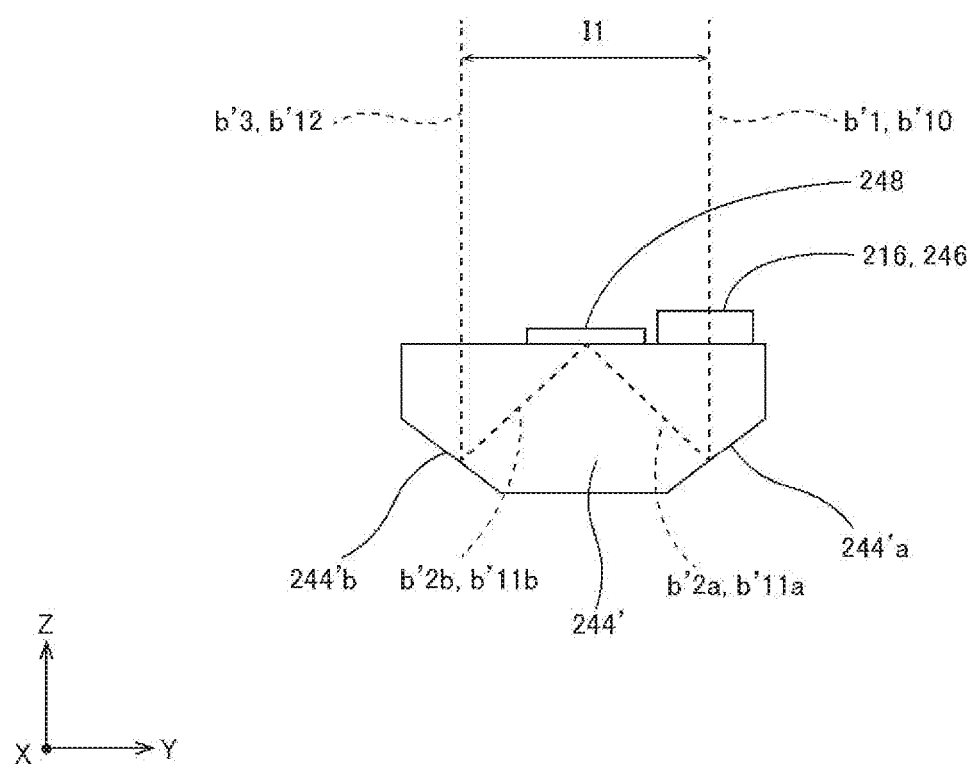
FIG. 16 is a side view illustrating an outline of a structure of other modified example of a prism with reflection film provided in modified example of the displacement detection device relating to one embodiment of the present invention.

Concretely, as illustrated in FIG. 16, the prism 244' with reflection film is configured such that prism surfaces 244'a and 244'b are arranged at vicinity of bottom surface side of the prism 244' with reflection film, and a reflection film 248 is arranged at approximately center of top surface side of the prism 244' with reflection film. In addition, structure and function of the birefringent member 216 and the variable reflection film 246 are same as which provided in the displacement detection device 100 relating to one embodiment of the present invention, so explanation of which are omitted.

By configuring the prism 244' with reflection film as the above, reflected light b'2a, b'11a of incident light b'1, b'10 into the prism 244' with reflection film reflected by the prism surface 244'a is reflected by the reflection film 248, and reflected light b'2b, b'11b reflected by the reflection film 248 is reflected by the prism surface 244'b. Therefore, even if the prism 244' with reflection film is moved to Y direction, which is a direction perpendicular to the measuring direction X, a spacing I1 between incident light b' 1, b'10 and reflected light b'3, b'12 reflected by the prism surface 244'b becomes constant, so receiving of light by each light receiving element 223, 224, 227, 228, 252, 254 (refer to FIG. 14) provided in the absolute position detection means 240 and the relative position detection means 210 becomes stable. Therefore, stable and high precision detection of displacement by the absolute position detection means 240 (refer to FIG. 14) and the relative position detection means 210 (refer to FIG. 14) will be possible.

Figure 17:
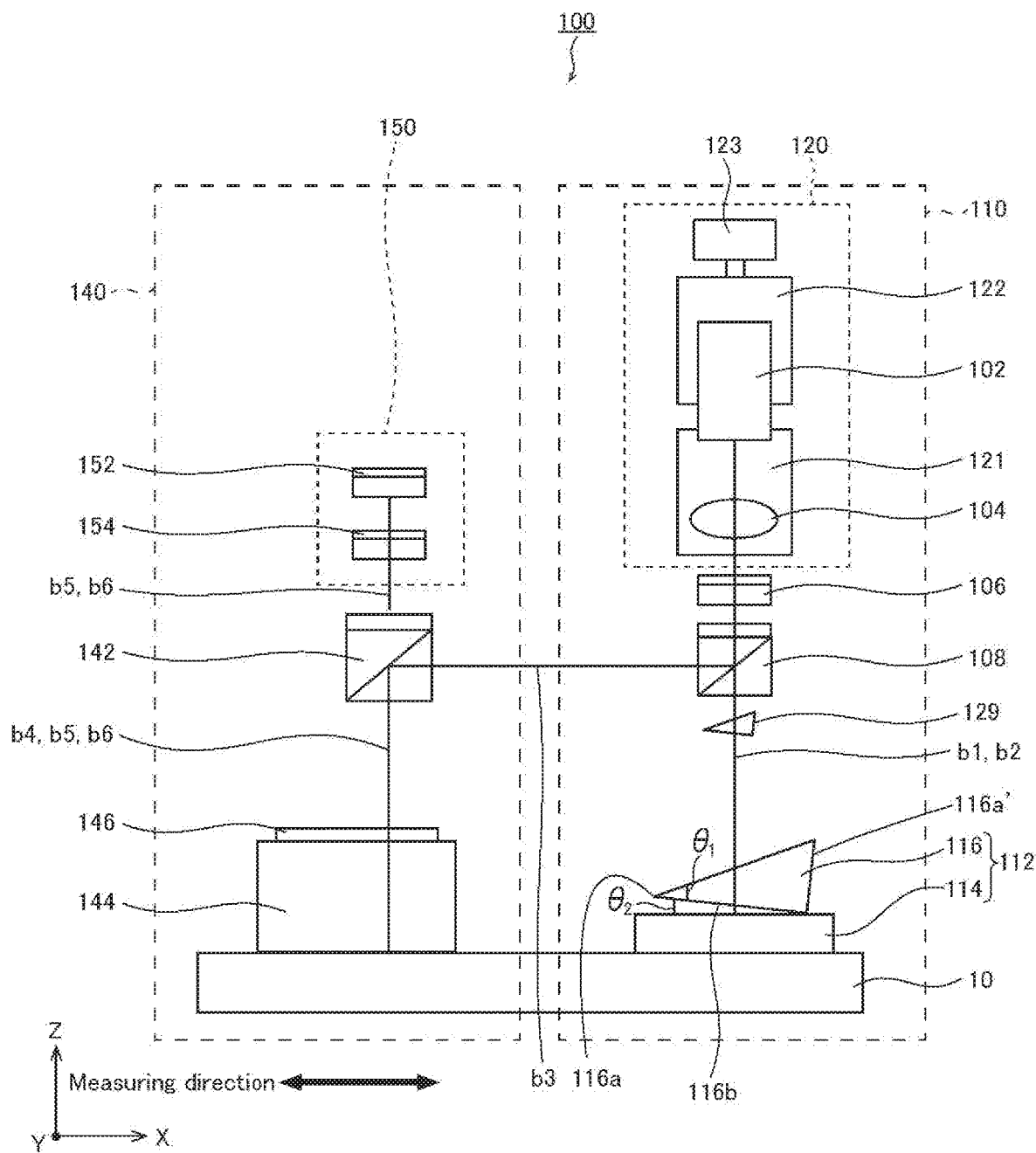
FIG. 17 is a front view illustrating an outline of a structure of other modified example of the displacement detection device relating to one embodiment of the present invention.
Figure 18:
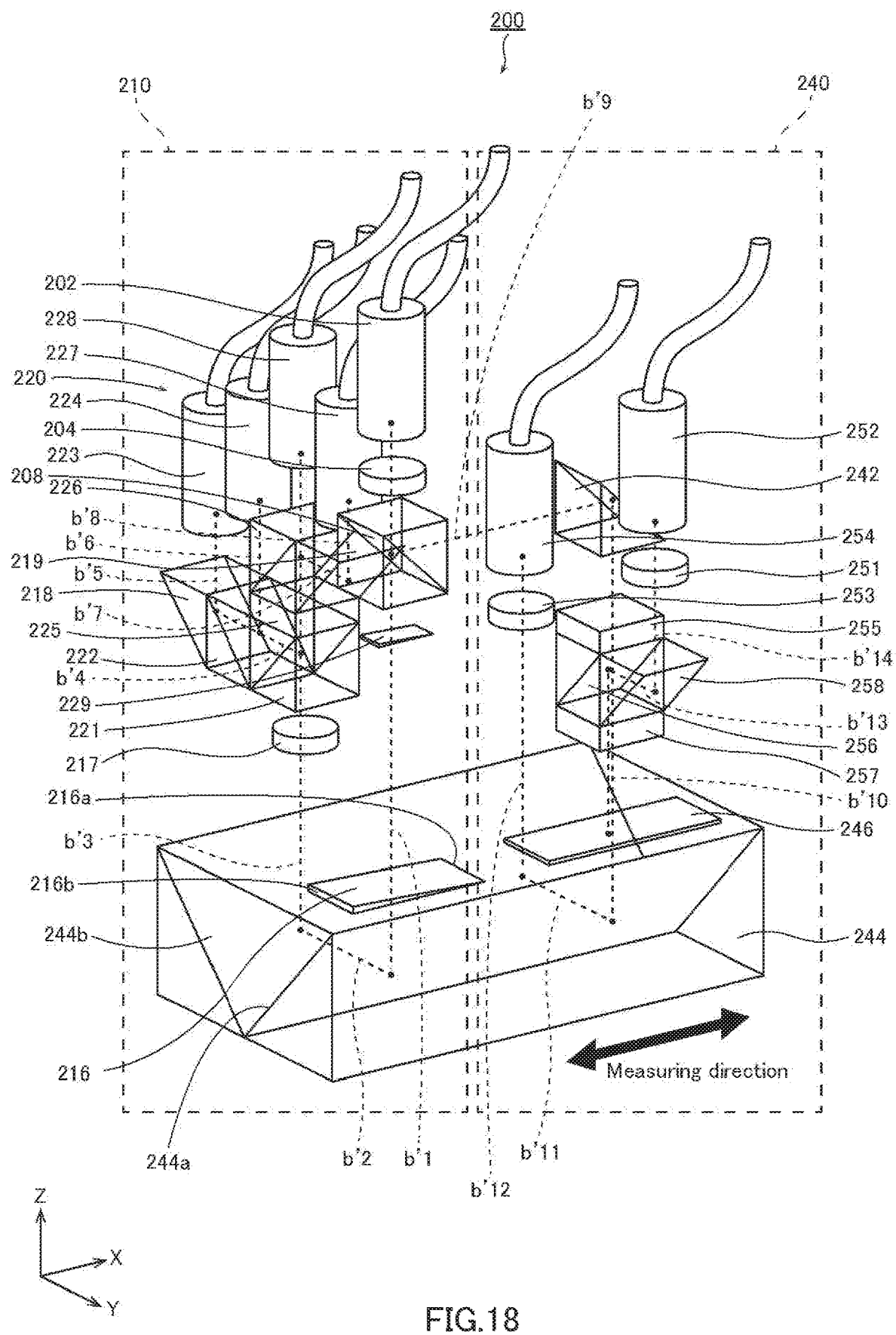
FIG. 18 is a perspective view illustrating an outline of a structure of a modified example of the displacement detection device relating to one embodiment of the present invention.

In addition, in the displacement detection device 100, 200, when it cannot be said that diameter of beam used for measurement is sufficiently small with respect to a length of one period of absolute position signal of the absolute position detection means 140, 240, as illustrated in FIGS. 17 and 18, beam may be transmitted through a correction prism 129, 229 before entering into the birefringent member 116, 216. At that time, a member having equivalent function as the birefringent member 116, 216, for example, a member with same material and same shape is used as the correction prism 129, 229. However, optical axis of crystal of the correction prism 129, 229 is being orthogonal to the birefringent member 116, 216. In addition, concerning location of the correction prism 129, 229, it could be arranged either before or after entering of beam into the birefringent member 116, 216, but it is only arranged at either one of them.

Figure 19A:
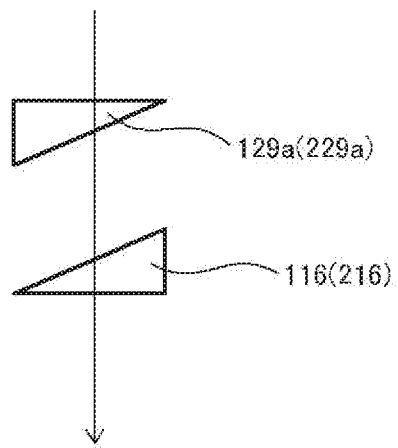
FIGS. 19A and 19B are explanatory drawings illustrating examples of other arrangement of a correction prism arranged at other modified example of the relative position detection means relating to one embodiment of the present invention.
Figure 19B:
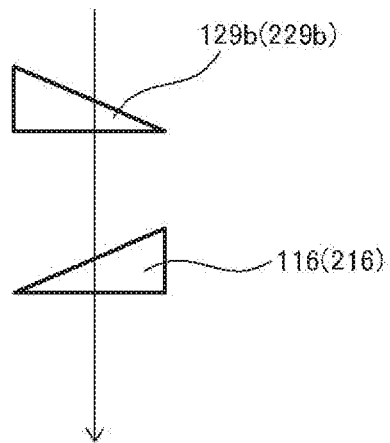

By arranging the correction prism 129, 229 with such configuration at either before or after entering of beam into the birefringent member 116, 216, polarization state in beam distribution transmitted through the birefringent member 116, 216 will be uniform. Thereby, stable and high precision detection of displacement by the absolute position detection means 140, 240 will be possible. In addition, as illustrated in FIG. 19A, a member having equivalent function as the birefringent member 116, 216, for example, a member with same material and same shape may be used as a correction prism 129a, 229a, and the correction prism 129a, 229a may be arranged to face the birefringent member 116, 216. In addition, as illustrated in FIG. 19B, it is possible to obtain equivalent effect even if a correction prism 129b, 229b is arranged to be symmetrical with the birefringent member 116, 216.

Figure 20:
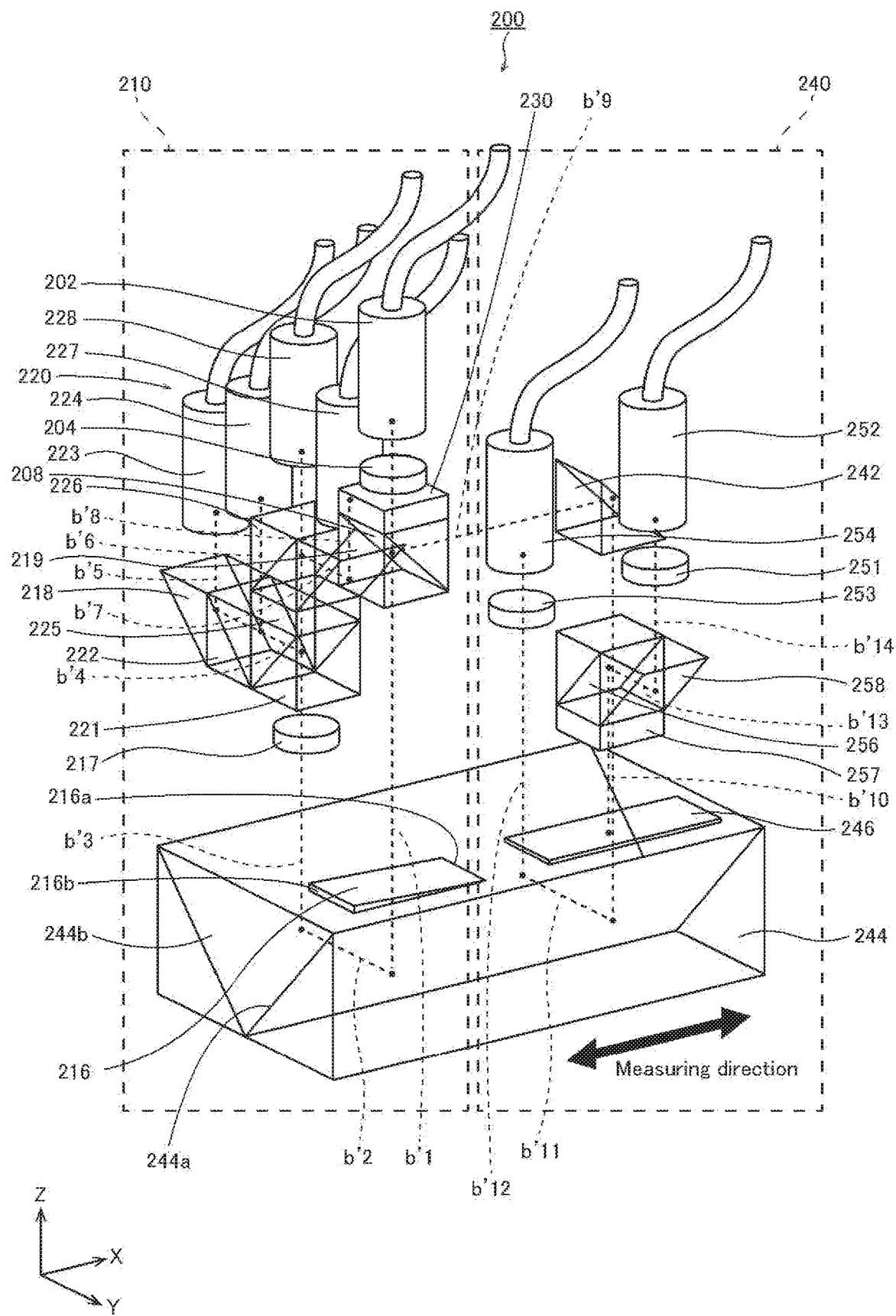
FIG. 20 is a perspective view illustrating an outline of a structure of other modified example of the displacement detection device relating to one embodiment of the present invention.

In addition, as illustrated in FIG. 20, with respect to the displacement detection device 200, a polarizing plate 230 may be mounted between a first lens 204 and a light source side beam splitter 208. By arranging the polarizing plate 230 as the above, beam used for detection of displacement can be higher in extinction ratio. Therefore, in the displacement detection device 200 using polarized light, higher precision detection of displacement will be possible. In addition, at this time, as illustrated in FIG. 20, in the absolute position detection means 240, arrangement of the polarizer 255 (refer to FIGS. 14 and 18) between the mirror 242 and the polarizing beam splitter 256 may be omitted. In addition, the polarizing plate 230 may be arranged anywhere between the light source 202 and the birefringent member 216, but it is most effective to arrange the polarizing plate 230 just in front of the birefringent member 216 with crystal axis of the polarizing plate 230 deviated 45 degrees with respect to crystal axis of the birefringent member 216. In that case, even if the object to be measured is rotated in Z direction, it is possible to inhibit influence of the rotation, so it is preferable. In addition, when the polarizing plate 230 is attached to the birefringent member 216, even if the object to be measured is rotated in Z direction, the polarizing plate 230 is also rotated together, so it is possible to inhibit influence of the rotation.

Figure 21:
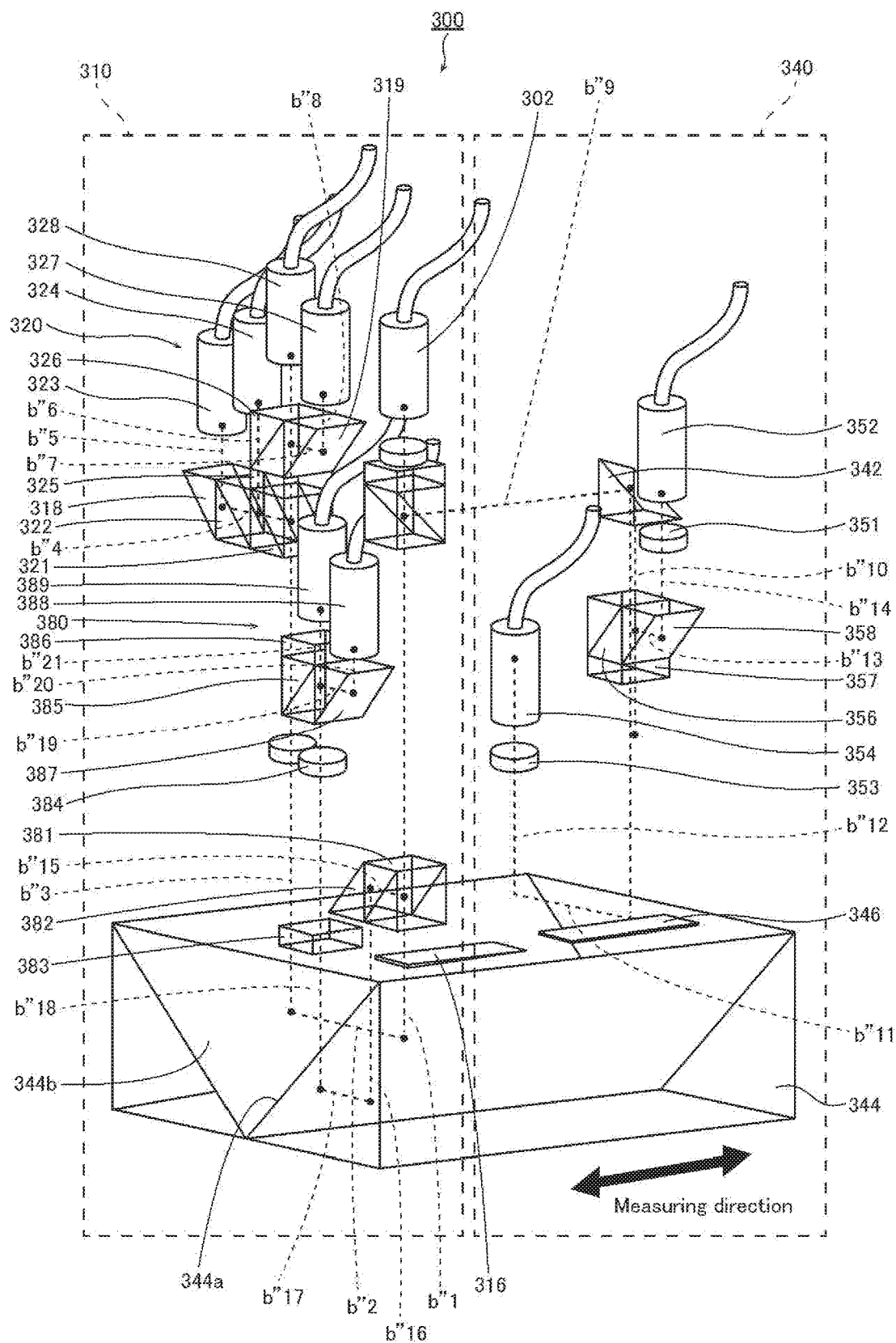
FIG. 21 is a perspective view illustrating an outline of a structure of other modified example of the displacement detection device relating to one embodiment of the present invention.

Further, as illustrated in FIG. 21, an azimuth correction unit 380 for performing azimuth correction with respect to reflected light may be further arranged at a light receiver for detection of relative position 320 provided in a relative position detection means 310 of a displacement detection device 300 of this embodiment. In this embodiment, as illustrated in FIG. 21, the azimuth correction unit 380 comprises: a beam splitter 381 for incident light; a reflection prism 382 for incident light; a polarizing plate 383 for azimuth correction; a lens 384 for detecting azimuth rotation; a beam splitter 385 for detecting azimuth rotation; a polarizing plate 386 for detecting azimuth rotation; a reflection prism 387 for power monitor; a light receiving element 388 for power monitor; and a light receiving element 389 for measuring angle. In addition, in this embodiment, in order to improve sensitivity of detection angle of azimuth, optical element for increasing a change of polarization azimuth angle such as half wavelength plate or dove prism may be arranged just in front of the beam splitter 385 for detecting azimuth rotation, or just in front of the light receiving element 389 for measuring angle.

As such, by arranging the azimuth correction unit 380, incident light b"1 from a light source 302 is split by the beam splitter 381 for incident light, and split light b"15 is reflected by the reflection prism 382 for incident light. And, reflected light b"16 is reflected by prism surfaces 344a and 344b in approximately V shape of a prism 344 with reflection film, and reflected light b"18 enters the beam splitter 385 for detecting azimuth rotation via the polarizing plate 383 for azimuth correction and the lens 384 for detecting azimuth rotation.

The reflected light b"18 entered the beam splitter 385 for detecting azimuth rotation is split into split light b"19, and the split light b"19 is reflected by the reflection prism 387 for power monitor, and reflected light b"20 enters the light receiving element 388 for power monitor. On the other hand, transmitted light b"21 of the reflected light b"18 entered the beam splitter 385 for detecting azimuth rotation enters the light receiving element 389 for measuring angle after transmitting through the polarizing plate 386 for detecting azimuth rotation.

The light receiving element 389 for measuring angle reads angle difference between the polarizing plate 383 for azimuth correction and the polarizing plate 386 for detecting azimuth rotation, and measures azimuth angle. Lissajous will be warped when azimuth is rotated, and the warp will be a cause for measurement error, so its correction is necessary. At that time, it is possible to correct if amount of angle deviation of azimuth is known previously, so a function to detect azimuth angle will be necessary. Here, in this embodiment, the azimuth correction unit 380 for performing azimuth correction with respect to reflected light is arranged at the light receiver for detection of relative position 320. Therefore, difference by angle difference of reflected light transmitted through the polarizing plates 383 and 386 will be modified, and higher precision detection of displacement will be possible. In addition, structure and operation of an absolute position detection means 340, and other components of the relative position detection means 310 of the displacement detection device 300 in this embodiment are same as the displacement detection device 200 relating to one embodiment of the present invention, so explanation of which are omitted.

In addition, it was explained in detail about each embodiments of the present invention as the above, but it is easy for those who skilled in the art to understand that various modifications are possible without substantially departing from new matters and effects of the present invention. Therefore, all of such modified examples are included within the scope of the present invention.

For example, a term used at least once in the description or drawings together with a different term that is broader or the same in meaning can also be replaced by the different term in any place in the description or drawings. Further, the structure and the operation of the displacement detection device and the relative position detection means are not limited to those described in each embodiments of the present invention but may be carried out in various modifications.

GLOSSARY OF DRAWING REFERENCES

10 Object to be measured
100, 200, 300 Displacement detection device
102, 202, 302 Light source
104, 204 First lens
106, 255 Polarizer
108, 208 Light source side beam splitter
110, 210, 310 Relative position detection means
112 Target
114, 244, 344 Reflector
116, 216, 316 Birefringent member
116a Tip of 116
116b Base end of 116
120, 220, 320 Light receiver for detection of relative position
121, 221, 321 Beam splitter
122, 222, 322 First polarizing beam splitter
123, 223, 323 First light receiving element
124, 224, 324 Second light receiving element
125, 225, 325 Quarter wavelength plate
126, 226, 326 Second polarizing beam splitter
127, 227, 327 Third light receiving element
128, 228, 328 Fourth light receiving element
129, 229 Correction prism
130 Relative position information output unit
131 First differential amplifier
132 Second differential amplifier
133 First A/D converter
134 Second A/D converter
135 Waveform correction processing unit
136 Incremental signal generator
140, 240, 340 Absolute position detection means
142, 242, 342 Mirror
144 Prism
146, 246, 346 Variable reflection film
150 Light receiver for detection of absolute position
151, 251, 351 Second lens
152, 252, 352 Fifth light receiving element
153, 253, 353 Third lens
154, 254, 354 Sixth light receiving element
160 Absolute position information output unit
161 First absolute position information computing unit
162 Second absolute position information computing unit
163 Comparator
164 Adding machine
165 Absolute position converter
170 Absolute position signal generator
230 Polarizing plate
380 Azimuth correction unit

The invention claimed is:

1. A relative position detection means for optically detecting a relative position of displacement of an object to be measured in a measuring direction, comprising:
a target mounted on the object to be measured and irradiated with light from a light source;
a light receiver for detection of relative position for receiving light by changing polarization state of reflected light at the target with respect to the light; and
a relative position information output unit for outputting relative position information based on displacement of the target in the measuring direction based on change of polarization state of the reflected light received at the light receiver for detection of relative position,
wherein the target comprises:
a reflector mounted on the object to be measured; and
a birefringent member provided on the reflector and having a thickness changing from a tip to a base end along the measuring direction,
the birefringent member is configured such that tip side of a bottom surface is rotatable with respect to the reflector with base end side of the bottom surface as a center.

2. The relative position detection means according to claim 1, wherein the light receiver for detection of relative position detects a change of polarization state of the reflected light along with movement of the target in the measuring direction,
the relative position information output unit outputs the relative position information of the target based on a signal obtained by photoelectric conversion of a change of polarization state of the reflected light.

3. The relative position detection means according to claim 1, wherein the light receiver for detection of relative position comprises:
a beam splitter for splitting the reflected light into two;
a first polarizing beam splitter for transmitting P component and reflecting S component of one reflected light split by the beam splitter;
a first light receiving element for receiving transmitted light of the first polarizing beam splitter;
a second light receiving element for receiving reflected light of the first polarizing beam splitter;
a second polarizing beam splitter for transmitting P component and reflecting S component of another reflected light split by the beam splitter;
a quarter wavelength plate interposed between the beam splitter and the second polarizing beam splitter;
a third light receiving element for receiving reflected light of the second polarizing beam splitter; and
a fourth light receiving element for receiving transmitted light of the second polarizing beam splitter.

4. The relative position detection means according to claim 1, wherein the birefringent member is configured by arranging a plurality of different members in parallel along the measuring direction, or is configured by laminating a plurality of different members along incident direction of the light.

5. The relative position detection means according to claim 4, wherein the birefringent member is configured by laminating a plurality of members with different crystal axis direction along incident direction of the light.

6. The relative position detection means according to claim 1, wherein a correction prism is provided at any of front stage side or rear stage side of the birefringent member with respect to the light source.

7. The relative position detection means according to claim 1, wherein two light receivers for detection of relative position are arranged along the measuring direction, and it is arranged to estimate and correct wavelength variation amount based on a difference of phase fluctuation amount of polarization state of the reflected light detected by each light receiver for detection of relative position.

8. The relative position detection means according to claim 1, wherein a polarizing plate is further arranged between the light source and the birefringent member.

9. The relative position detection means according to claim 1, wherein an azimuth correction unit for performing azimuth correction to the reflected light is further arranged at the light receiver for detection of relative position.

10. A displacement detection device for optically detecting a displacement in a measuring direction of an object to be measured, comprising:
   a light source for irradiating light;
   a light source side beam splitter for splitting the light from the light source into two;
   a relative position detection means for detecting relative position of the displacement of the object to be measured in the measuring direction based on a change of polarization state of reflected light with respect to one light split by the light source side beam splitter;
   an absolute position detection means for detecting absolute position of the displacement of the object to be measured in the measuring direction based on a change of light quantity of reflected light with respect to another light split by the light source side beam splitter,
   wherein the absolute position detection means and the relative position detection means are arranged on in-line with respect to the measuring direction of the object to be measured,
   wherein the relative position detection means comprises:
      a target mounted on the object to be measured and irradiated with light from the light source;
      a light receiver for detection of relative position for receiving light by changing polarization state of reflected light at the target with respect to the light; and
      a relative position information output unit for outputting relative position information based on the displacement of the target in the measuring direction based on a change of polarization state of the reflected light received at the light receiver for detection of relative position,
   wherein the target comprises:
      a reflector mounted on the object to be measured; and
      a birefringent member provided on the reflector and having a thickness changing from a tip to a base end along the measuring direction,
      the birefringent member is configured such that tip side of a bottom surface is rotatable with respect to the reflector with base end side of the bottom surface as a center.

11. The displacement detection device according to claim 10, wherein the light receiver for detection of relative position detects a change of polarization state of the reflected light along with movement of the target in the measuring direction, and
   the relative position information output unit outputs the relative position information of the target based on a signal obtained by photoelectric conversion of a change of polarization state of the reflected light.

12. The displacement detection device according to claim 10, wherein the absolute position detection means comprises:
   a prism mounted on the object to be measured and irradiated with the light from the light source via a mirror;
   a light receiver for detection of absolute position for receiving light by changing light quantity of reflected light at the prism with respect to the light; and
   an absolute position information output unit for outputting absolute position information based on displacement of the prism in the measuring direction based on a change of the light quantity of the reflected light received at the light receiver for detection of absolute position,
   wherein at top surface side of the prism, a variable reflection film, in which reflection characteristic varies along the measuring direction, is provided.

* * * * *